US007753067B2

(12) United States Patent
Bolt et al.

(10) Patent No.: US 7,753,067 B2
(45) Date of Patent: Jul. 13, 2010

(54) SHEAR VALVE EMPLOYING TWO-STAGE POPPET VALVE, PARTICULARLY FOR USE IN FUELING ENVIRONMENTS

(75) Inventors: David J. Bolt, Newry, PA (US); Dale Ewing, Hollidaysburg, PA (US); Shane Reese, Hollidaysburg, PA (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 1033 days.

(21) Appl. No.: 11/433,140

(22) Filed: May 12, 2006

(65) Prior Publication Data

US 2006/0249204 A1 Nov. 9, 2006

Related U.S. Application Data

(63) Continuation-in-part of application No. 11/354,394, filed on Feb. 15, 2006, and a continuation-in-part of application No. 11/354,886, filed on Feb. 15, 2006.

(60) Provisional application No. 60/654,390, filed on Feb. 18, 2005.

(51) Int. Cl.
*F16K 17/40* (2006.01)

(52) U.S. Cl. .................. 137/12; 137/68.14; 137/630.14

(58) Field of Classification Search .............. 137/68.14, 137/630, 630.14, 630.22, 12
See application file for complete search history.

(56) References Cited

U.S. PATENT DOCUMENTS 2,413,087 A 12/1946 Urbany
2,642,086 A * 6/1953 Conklin et al. ......... 137/630.14
2,665,714 A * 1/1954 Greenwood ............ 137/630.14
2,965,116 A 12/1960 Boone et al.
3,209,773 A * 10/1965 Klaus ...................... 137/68.14
3,860,025 A * 1/1975 Nelson ..................... 137/68.14
4,067,359 A * 1/1978 Kwast ................... 137/630.14
4,131,142 A * 12/1978 Barr et al. ................ 137/68.14
5,054,509 A 10/1991 Grantham (Continued)

OTHER PUBLICATIONS

OPW Brochure Regarding Emergency Shut-Off Valve, copyright 2007.

(Continued)

*Primary Examiner*—John Rivell
(74) *Attorney, Agent, or Firm*—Nelson Mullins Riley & Scarborough LLP

(57) ABSTRACT

A shear valve employing a two-stage main poppet valve. The two-stage main poppet valve that can be opened with less force than normally required by prior art designs. For example, if there is pump pressure trapped on the upstream side of the two-stage main poppet valve and little or no pressure or atmospheric pressure on the downstream side, more force than can be provided may be required to open the two-stage main poppet valve to reset the shear valve after the two-stage main poppet valve is closed. The two-stage main poppet valve is designed to first begin to equalize pressure differential across the shear valve without opening a main poppet valve head from its seat inside the shear valve. Thereafter, the main poppet valve head can be opened with less force than otherwise would be required.

28 Claims, 20 Drawing Sheets

U.S. PATENT DOCUMENTS

| | | | | |
|---|---|---|---|---|
| 5,098,221 | A | 3/1992 | Osborne | |
| 5,099,870 | A * | 3/1992 | Moore et al. | 137/68.14 |
| 5,120,488 | A | 6/1992 | Borrman et al. | |
| 5,244,006 | A | 9/1993 | Pettesch | |
| 5,285,829 | A | 2/1994 | Bravo | |
| 5,289,842 | A | 3/1994 | Bravo | |
| 5,297,896 | A | 3/1994 | Webb | |
| 5,341,857 | A | 8/1994 | Bravo | |
| 5,351,707 | A | 10/1994 | Bravo | |
| 5,427,474 | A | 6/1995 | Silvers | |
| 5,490,419 | A | 2/1996 | Webb | |
| 5,527,130 | A | 6/1996 | Webb | |
| 5,529,098 | A | 6/1996 | Bravo | |
| 5,553,971 | A | 9/1996 | Osborne | |
| 5,567,083 | A | 10/1996 | Osborne | |
| 5,590,981 | A | 1/1997 | Osborne | |
| 5,713,607 | A | 2/1998 | Webb | |
| 5,717,564 | A | 2/1998 | Lindale | |
| 5,775,842 | A | 7/1998 | Osborne | |
| 5,831,149 | A | 11/1998 | Webb | |
| 5,927,762 | A | 7/1999 | Webb | |
| 6,003,554 | A * | 12/1999 | Magdelyns et al. | 137/630.14 |
| 6,116,817 | A | 9/2000 | Osborne | |
| 6,182,679 | B1 | 2/2001 | Pendleton | |
| 6,371,154 | B1 | 4/2002 | Kesterman et al. | |
| 7,503,205 | B2 | 3/2009 | Baillergeon et al. | |
| 7,555,935 | B2 | 7/2009 | Baillergeon et al. | |
| 2004/0045343 | A1 | 3/2004 | Hutchinson | |
| 2004/0149017 | A1 | 8/2004 | Hutchinson et al. | |
| 2004/0182136 | A1 | 9/2004 | Halla et al. | |
| 2004/0261504 | A1 | 12/2004 | Hutchinson et al. | |
| 2006/0185729 | A1 | 8/2006 | Ingram | |
| 2006/0260680 | A1 | 11/2006 | Reid et al. | |

OTHER PUBLICATIONS

Office Action issued by the USPTO on Dec. 19, 2008 for U.S. Appl. No. 11/354,886.

Amendment filed with the USPTO on Jun. 19, 2009 for U.S. Appl. No. 11/354,886.

Notice of Allowance issued by the USPTO on Jan. 25, 2010 for U.S. Appl. No. 11/354,886.

Office Action Issued by the USPTO on Aug. 10, 2009 for U.S. Appl. No. 11/411,182.

Office Action issued by the USPTO on Dec. 18, 2009 for U.S. Appl. No. 11/354,394.

Amendment filed with the USPTO on Jan. 11, 2010 for U.S. Appl. No. 11/411,182.

* cited by examiner

SHEAR VALVE EMPLOYING TWO-STAGE POPPET VALVE, PARTICULARLY FOR USE IN FUELING ENVIRONMENTS

RELATED APPLICATIONS

This application is a continuation-in-part application of U.S. patent application Ser. No. 11/354,394, filed Feb. 15, 2006, and is a continuation-in-part of U.S. patent application Ser. No. 11/354,886, filed Feb. 15, 2006, both of which claim priority to U.S. Provisional Patent Application No. 60/654,390 entitled "DOUBLE WALL CONTAINED SHEAR VALVE, PARTICULARLY FOR FUELING ENVIORNMENTS," filed on Feb. 18, 2005, all of which are incorporated herein by reference in their entireties.

FIELD OF THE INVENTION

The present invention relates to a shear valve employing a two-stage poppet valve, which may or may not be secondarily contained, to allow the poppet valve to be opened with less force.

BACKGROUND OF THE INVENTION

In service station environments, fuel is delivered to fuel dispensers from underground storage tanks (UST), sometimes referred to as fuel storage tanks. USTs are large containers located beneath the ground that hold fuel. A separate UST is provided for each fuel type, such as low octane gasoline, high-octane gasoline, and diesel fuel. In order to deliver the fuel from the USTs to the fuel dispensers, typically, a submersible turbine pump (STP) is provided that pumps the fuel out of the UST and delivers the fuel through a main fuel piping conduit that runs beneath the ground in the service station. Other types of pumps other than a STP, such as a self-contained pump within the dispenser housing for example, may be employed.

A shear valve employs a single-stage main poppet valve that controls the flow of fuel through the shear valve. The main poppet valve is located inside the shear valve in the fuel flow path. When the shear valve is opened, fuel is allowed to flow. When the shear valve is closed, in response to a shear or other safety condition, fuel flow is prevented. After the safety condition is remedied, it is necessary to reset the shear valve to open the main poppet valve to allow fuel flow. The main poppet valve is manually reopened.

However, a large amount of force may be necessary to open the main poppet valve, making it very difficult or impossible to open and reset the shear valve. For example, if there is pump pressure trapped on the upstream side of the main poppet valve and little or no pressure or atmospheric pressure on the downstream side, more force than can be provided may be required to open the main poppet valve to reset the shear valve after the main poppet valve is closed. Thus, opening the main poppet valve may be difficult for service personnel. Application of force to open the main poppet valve may damage the shear valve and make it unusable. Damage to the shear valve may go unnoticed by service personnel.

Thus, the present invention provides a shear valve that requires less force to open the main poppet valve in case there is a substantial pressure differential across the valve after it is closed.

SUMMARY OF THE INVENTION

The present invention is a shear valve employing a two-stage main poppet valve. The two-stage main poppet valve can be opened with less force than normally required by prior art designs. For example, if there is pump pressure trapped on the upstream side of the two-stage main poppet valve and little or no pressure or atmospheric pressure on the downstream side, more force than can be provided may be required to open the two-stage main poppet valve to reset the shear valve after the two-stage main poppet valve is closed. The two-stage main poppet valve is designed to first begin to equalize pressure differential across the shear valve without opening the two-stage main poppet valve head from its seat inside the shear valve. Thereafter, the two-stage main poppet valve head can be opened with less force than otherwise would be required.

In one embodiment of the present invention, the two-stage main poppet valve contains an inner diameter seal fitted to an inner diameter tube coupled to the downstream side of the shear valve. Once the inner diameter seal is opened, the inner diameter tube is coupled to the upstream side of the two-stage main poppet valve to begin to equalize pressure across the two-stage main poppet valve. The inner diameter tube has a diameter less than the diameter of the fuel flow path. Thus, less force is required to open the inner diameter seal than to open the two-stage main poppet valve seal, because the two-stage main poppet valve seal rests against the entire, larger diameter of the fuel flow path. When the inner diameter seal is opened, the pressure differential between the upstream and downstream side of the two-stage main poppet valve starts to equalize. As this equalization occurs, the force required to open the two-stage main poppet valve seal is lessened, thereby allowing the vacuum actuator to completely open the two-stage main poppet valve and thus reset the shear valve to an operational condition.

Another embodiment of the present invention is directed to a double-walled shear valve, preferably for use in a fuel dispenser. The double-walled shear valve contains an inner housing forming a fuel flow path. An outer housing or containment housing is provided that surrounds, either partially or wholly, the inner housing to provide a second containment. The containment housing may also provide part of the fuel flow path. An interstitial space is formed between the inner housing and the containment housing. In this manner, a leak that results due to breach of an inner housing of the shear valve may be contained within the interstitial space between the inner and containment housing instead of leaking to the environment.

The interstitial space can further be placed under a vacuum or pressure. The vacuum or pressure level within the interstitial space is monitored to detect breaches in either the inner housing or the containment housing of the shear valve, which may be caused by a shear of the shear valve for example. The interstitial space is monitored for pressure or vacuum level variations. If the pressure or vacuum level varies beyond thresholds or expectations, a leak may be present.

In another embodiment of the present invention, the double-walled shear valve contains a vacuum actuator. The vacuum actuator is coupled to the interstitial space of the double-walled shear valve. The vacuum actuator responds to generation of vacuum levels or loss thereof in the interstitial space or other system having a separate interstitial space. When a sufficient vacuum level is maintained, the vacuum actuator keeps the two-stage main poppet valve within the fuel flow path of the shear valve open to allow fuel to flow through the shear valve. The two-stage main poppet valve is kept open as long as a sufficient vacuum level is maintained in the interstitial space. If a leak or shear occurs, the interstitial space loses vacuum level. In response, the vacuum actuator automatically causes the two-stage main poppet valve to close, thereby closing off the fuel flow path within the shear valve to prevent fuel from leaking to the environment. Once a sufficient vacuum level is restored in the interstitial space, the vacuum actuator automatically reopens the two-stage main poppet valve to allow fuel to flow through the shear valve once again.

The shear valve may also be designed to allow automatic coupling of its interstitial space to the interstitial space of a branch fuel piping and/or internal fuel dispenser piping when such fuel piping is coupled to the shear valve. In this manner, a monitoring system that is used to monitor the interstitial space of fuel piping can also be used to monitor the interstitial space of the shear valve as one single monitored zone.

In another embodiment of the invention, the interstitial space of the double-walled shear valve is blocked from extending beyond the outlet of the shear valve. In this manner, the interstitial space of the shear valve is not coupled to an interstitial space of the internal fuel dispenser piping. Thus, a monitoring system that monitors the pressure or vacuum level of the double-walled shear valve is not designed or intended to also monitoring of the interstitial space of the internal fuel dispenser piping. For example, it may be desired to sell this version of the double-walled shear valve to customers that either do not support or are not authorized to support the monitoring of the internal fuel dispenser piping.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a shear valve employing a two-stage main poppet valve. The two-stage main poppet valve can be opened with less force than normally required by prior art designs. For example, if there is pump pressure trapped on the upstream side of the two-stage main poppet valve and little or no pressure or atmospheric pressure on the downstream side, more force than can be provided may be required to open the two-stage main poppet valve to reset the shear valve after the two-stage main poppet valve is closed. The two-stage main poppet valve is designed to first begin to equalize the pressure differential across the valve without opening the two-stage main poppet valve head from its seat inside the shear valve. Thereafter, the two-stage main poppet valve head can be opened with less force than otherwise would be required.

In another embodiment, the shear valve is a double-walled shear valve. The shear valve contains an outer or containment housing to provide a second containment around an inner housing. The inner and containment housings also contain orifices within that are coupled together to provide a fuel flow path through the shear valve. An interstitial space is formed between the inner housing and the containment housing. In this manner, a leak that results due to a breach of the inner housing of the shear valve is contained within the interstitial space between the inner and containment housings.

The interstitial space can further be placed under a vacuum or pressure. The vacuum or pressure level within the interstitial space is monitored to detect breaches in either the inner housing or the containment housing of the shear valve, and/or a shear of the shear valve. For example, if a vacuum is applied to the interstitial space of the shear valve, the interstitial space can be monitored for pressure variations. A vacuum actuator controls the opening and closing of a two-stage main poppet valve located inline to the fuel flow path of the shear valve in response to vacuum generation and loss in the interstitial space or other system having a separate interstitial space.

Figure 1:
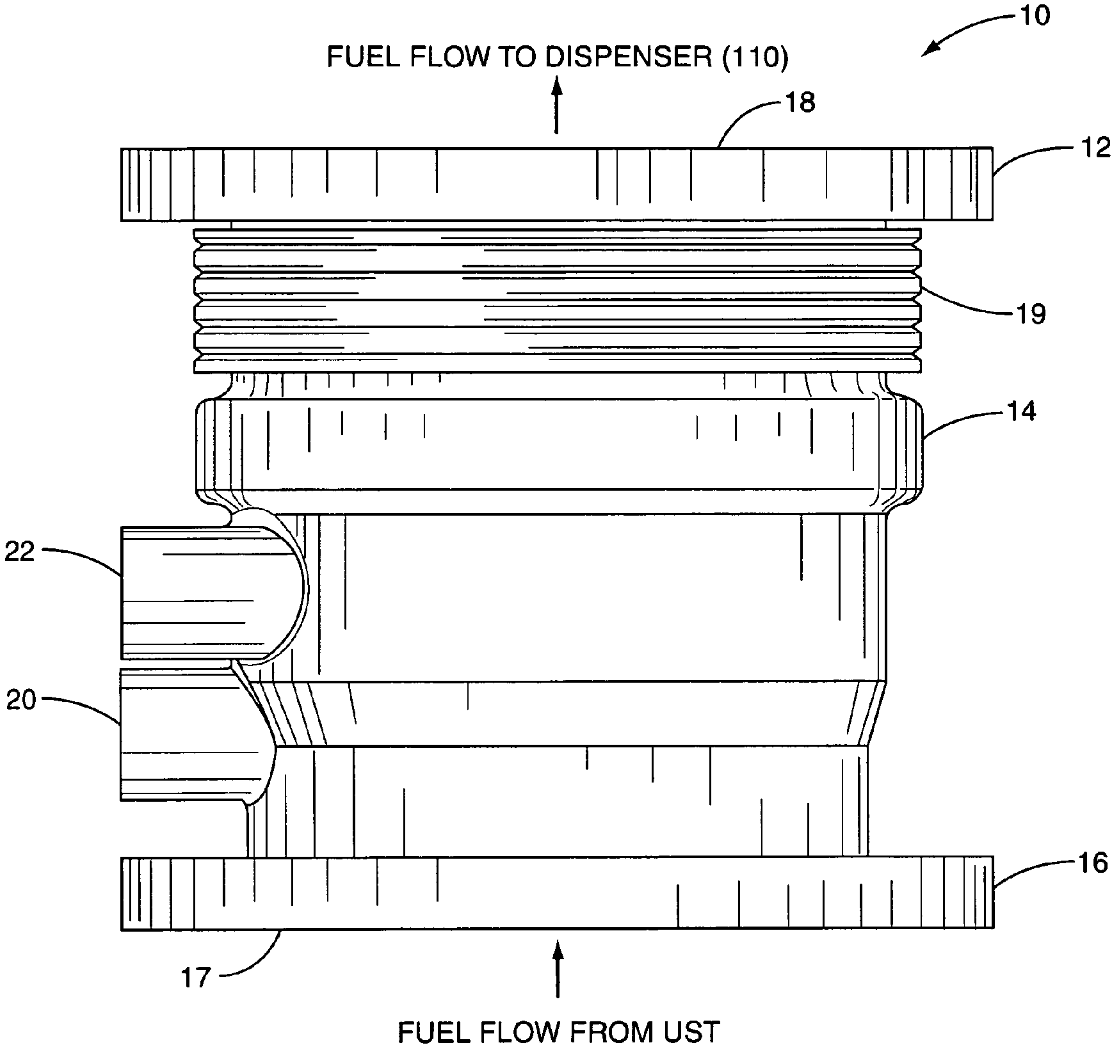
FIG. 1 is an exemplary illustration of a double-walled contained shear valve in accordance with the present invention.

The shear valve in accordance with one embodiment of the present invention is illustrated in the external view diagram in FIG. 1. In FIG. 1, the shear valve (generally designated as element 10) is illustrated from a side view. The shear valve 10 is comprised of three housings fitted together to form one shear valve 10. The shear valve 10 is comprised of a downstream housing 12, which is coupled to a containment housing or outer housing 14, which in turn is coupled to an upstream housing 16. This patent application will describe the inner connections between these housings 12, 14, and 16 in FIG. 3 below.

An orifice (not shown in FIG. 1) in the upstream housing 16 provides an inlet 17 for fuel to flow from an underground storage tank (not shown in FIG. 1) through an internal fuel flow path (not shown in FIG. 1) of the shear valve 10. The fuel that flows through the inlet 17 through the fuel flow path internal to the shear valve 10 exits through an outlet 18 that is formed by an orifice 26 (shown in FIG. 2) in the downstream housing 12.

Figure 3:
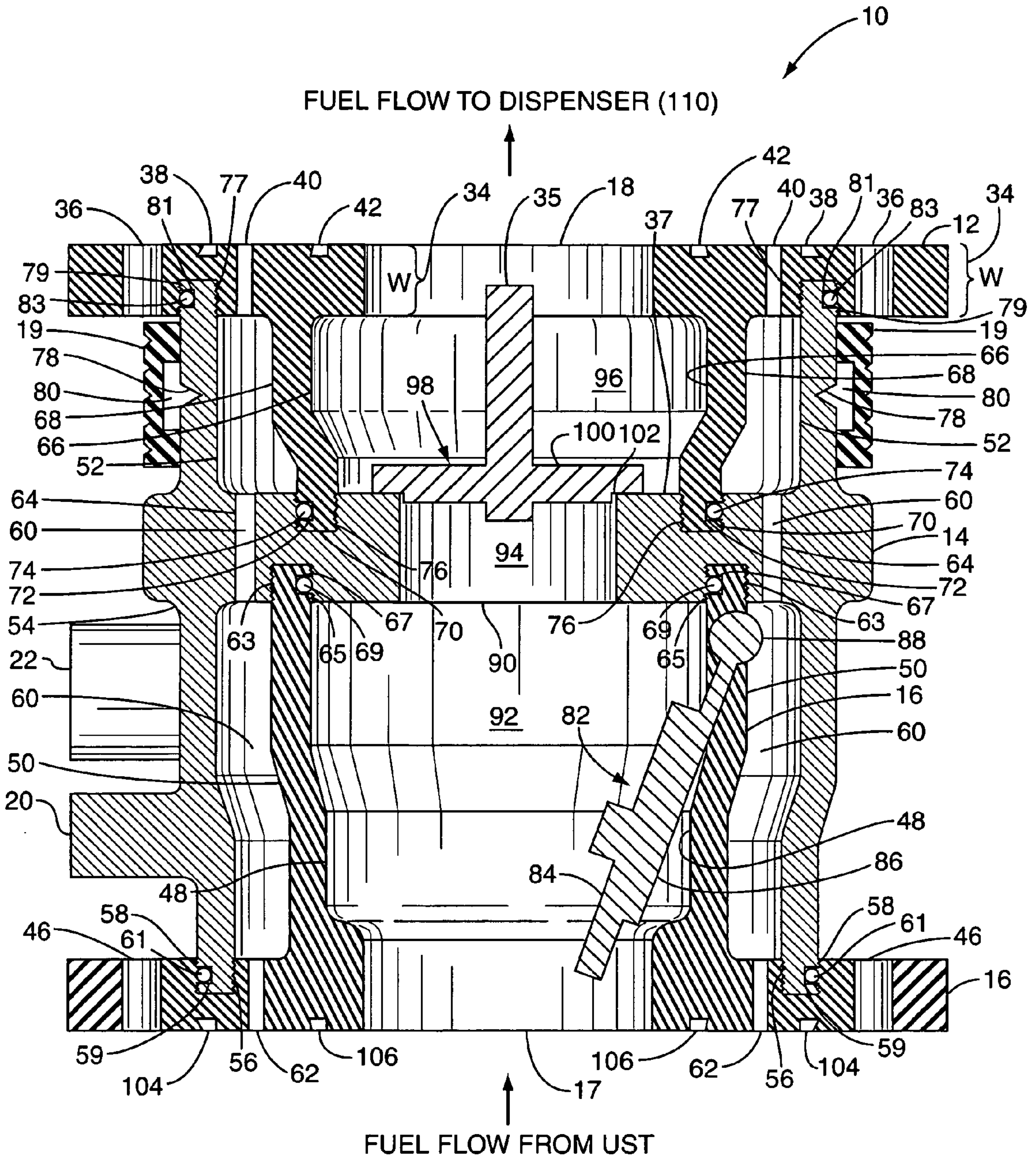
FIG. 3 is a cross section illustration of the shear valve illustrated in FIG. 1.

A leak skirt 19 is provided around a portion of the containment housing 14 so that any fuel that leaks around the shear groove (illustrated in FIG. 3) is prevented from leaking to the environment in the event that the shear valve 10 incurs an impact or other force causing a shearing. Mounting bosses 20, 22 are attached or provided as part of the containment housing 14 to mount the shear valve 10 in place when installed in the field, as is well known to one of ordinary skill in the art. The shear valve 10 may also contain an interstitial space port 277 (illustrated in FIG. 16) that is fluidly coupled to the interstitial space formed between the outer housing 14 and the downstream and upstream housings 12, 16 as illustrated in FIG. 3. This allows a vacuum or pressure-generating source to generate a vacuum or pressure in the interstitial space around the shear valve 10 for monitoring, as described above, to test the integrity of the housings 12, 14, 16 and the interstitial space around the shear valve 10 for detection of breaches or leaks. This secondary containment leak detection and prevention aspect is described in more detail in U.S. Pub. App. No. 2004/0261504 to Hutchinson et al. (the '504 application), incorporated by reference herein for all purposes.

Figure 2:
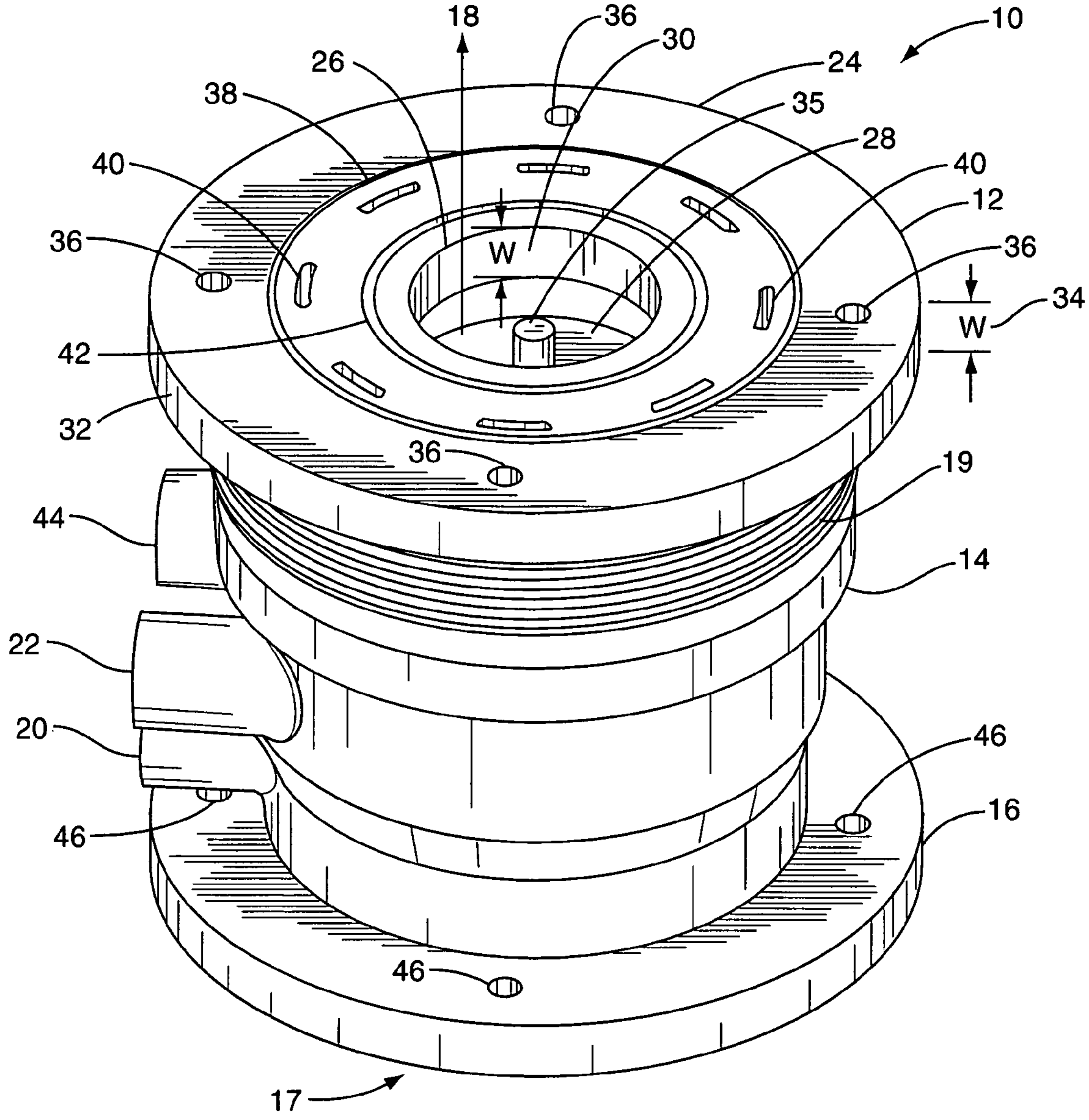
FIG. 2 is an illustration of the shear valve illustrated in FIG. 1 from a top angled view to show the top of the shear valve.

FIG. 2 illustrates the shear valve 10 illustrated in FIG. 1, except that the illustration is from the perspective of a top angle view to show the top of the shear valve 10 and the components and structure of the downstream housing 12. The downstream housing 12 consists of a flange 24 that contains an orifice 26 in approximately the center of the flange 24. The orifice 26 forms a fuel flow path 28 through the downstream housing 12. This fuel flow path 28 is coupled to the fuel flow path that is formed by the upstream housing 16, as will be illustrated more clearly in FIG. 3. The orifice 26 in the flange 24 forms an inner wall 30 that has a thickness shown as 'W', also show as element 34. The flange 24 also contains an outer wall 32 having the same thickness on its outer edge.

FIG. 2 shows a secondary poppet stem 35, that may be spring loaded, that is attached to a secondary poppet valve 98 (illustrated in FIG. 3) that moves downward against a secondary poppet seat 37 (illustrated in FIG. 3) when a shear occurs similar to that disclosed in U.S. Pat. No. 5,244,006, incorporated herein by reference in its entirety. The flange 24 of the downstream housing 12 contains one or more orifices 36 that are used to secure the flange 24 to fuel piping that may be internal to the fuel dispenser (not shown) in a tight manner, using bolts or various other fastening means, so that the fuel flowing through the fuel flow path 28 enters into the fuel piping connected to the flange 24. The flange 24 also contains grooves 38, 42 on the top surface of the flange 24 that are designed to hold an o-ring in place and against a mating fuel piping connection (not shown) so that a tight seal is formed between the outlet 18 of the shear valve 10 and a mated fuel piping.

The flange 24 also contains one or more orifices, called interstitial space orifices 40, that are fluidly coupled to the interstitial space formed between the containment housing 14 and the downstream and upstream housings 12, 16, as will be described in FIG. 3. This is so an interstitial space 60 (illustrated in FIG. 3) of the shear valve 10 can be fluidly coupled to fuel piping that is connected to the flange 24 to form one continuous interstitial space therebetween. In this manner, a leak detection or monitoring system can draw a vacuum or pressurize the interstitial space orifice 40/interstitial space 60 and monitor the interstitial space 40/60 around the shear valve 10 and fuel piping as one contiguous space.

FIG. 2 also shows a third mounting boss 44, which in combination with mounting bosses 20, 22, allows the shear valve 10 to be physically attached and/or held into place when installed. A support beam or bar (not illustrated) is placed in between mounting bosses 20, 44 and mounting boss 20 so that the mounting bosses 20, 22, 44 surround interior space formed by the mounting bosses 20, 22, 44 to support the shear valve 10. FIG. 2 also shows orifices 46 in the upstream housing 16 that allow the shear valve 10 and its fuel flow path 28 to branch fuel piping located beneath the ground, which, in turn is coupled to the main fuel piping.

FIG. 3 illustrates a cross section illustration of the shear valve 10 illustrated in FIGS. 1 and 2. The upstream housing 16 is comprised of a uniform body that contains an internal orifice forming an upstream housing flow path 92. The thickness of the material comprising the upstream housing 16 provides an inner wall 48 and an outer wall 50. Similarly, the containment housing 14 contains an orifice forming containment housing flow path 94, wherein the thickness of the material comprising the containment housing 14 forms an inner wall 52 and an outer wall 54.

The containment housing 14 is secured to the upstream housing 16 by a threaded male outer edge 56 of the containment housing 14 that is screwed securely into a threaded female groove 58 formed as part of the upstream housing 16. The female threaded groove 58 contains an indentation 59 around its edge whereby an o-ring seal 61 is provided therein to provide sealing between the threaded female groove 58 and the threaded male outer edge 56, thereby sealing off a downstream housing flow path 96 and the interstitial space 60, between an outer wall 68 and the inner wall 52, from each other. Note that the connections between the outer containment housing 14 and the upstream housing 12 are shown as threaded connections, but may be provided as any other type of connection, including but not limited to a pin connection.

When the upstream housing 16 is secured to the containment housing 14 in this manner, the interstitial space 60 is formed between the outer wall 50 of the upstream housing 16 and the inner wall 52 of the containment housing 14. The upstream housing 16 provides an interstitial space orifice 62 that is fluidly coupled to the interstitial space 60 so that piping having an interstitial space that is connected to the upstream housing 16 can fluidly couple its interstitial space with the interstitial space 60 of the shear valve 10 to form one continuous space. Likewise, in order to maintain the fluid coupling of the interstitial space 60 throughout the shear valve 10, the containment housing 14 also contains an interstitial space orifice 62 that couples to interstitial space 60.

Also, the containment housing 14 has a threaded female groove 63, similar to threaded female groove 58 in the upstream housing 16, that mates with a male threaded outer edge 65, to assist in securing the upstream housing 16 to the containment housing 14 just as described above. Again, the threaded male outer edge 65 is provided with an indentation 67 to allow an o-ring seal 69 to placed therein to provide a seal just as described above.

The outer surface of the upstream housing 12 also contains grooves 104, 106, similar to grooves 38, 42 on the flange 24 of the downstream housing 12, that are designed to hold o-rings in place and against a mating fuel piping connection (not shown) so that a tight fit is formed between the inlet 17 of the shear valve 10 and a mated fuel piping.

The downstream housing 12 contains an orifice that forms a downstream housing fuel flow path 96 that is fluidly coupled to the outer housing flow path 94 and the upstream housing flow path 92. The downstream housing flow path 96 is only coupled to the outer housing flow path 94 and upstream housing flow path 92 when a main poppet valve 82, 96 is open. Due to the thickness of the material comprising the downstream housing 12, the downstream housing 12 has an inner wall 66 and an outer wall 68.

Just as provided for the connection between the containment housing 14 and the upstream housing 16, the containment housing 14 is also secured to the downstream housing 12 in a similar fashion. The containment housing 14 contains a female threaded groove 70 in which a threaded male outer edge 76 of the downstream housing 12 is screwed into to form a tight fit between the outer containment housing 14 and the downstream housing 12. The female threaded groove 70 contains an indentation 72 around its edge whereby an o-ring seal 74 is provided therein to provide a sealed fit between the female threaded groove 70 and the threaded male outer edge 76, thereby sealing off the downstream housing flow path 96 and the interstitial space 60, between the outer wall 68 and the inner wall 52, from each other. Note that the connections between the containment housing 14 and the downstream housing 12 are shown as threaded connections, but may be provided as any other type of connection, including but not limited to a pin connection.

Also, the containment housing 14 has a threaded female groove 77 that mates with a male threaded outer edge 79, to assist in securing the downstream housing 12 to the containment housing 14 just as described above. Again, the male threaded outer edge 79 is provided with an indentation 81 to allow an o-ring seal 83 to placed therein to provide a seal just as described above.

The containment housing 14 contains a shear groove 78 on the outer wall 54 to provide a shearing or impact or break point for the shear valve 10 to break or shear in a controlled fashion when impacted. The shear groove 78 extends around the circumference of the containment housing 14. In the event of a shear at the shear groove 78, fuel that may be captured in the interstitial space 60 may leak outside the containment housing 14. Therefore, the leak skirt 19 is provided around the circumference of the shear groove 78 and proximate to the shear groove 78 wherein a leak containment chamber 80 is formed to capture any leaks that may occur as a result of shearing at the shear groove 78. The leak skirt 19 may be manufactured out of any elastic or elastemer material.

The shear valve 10 contains the main poppet 82 comprised of a main poppet head 84 and a carrier 86 similar to the shear valve disclosed in U.S. Pat. No. 5,244,006, previously referenced and incorporated herein. The carrier 86 is connected to a rotatable shaft 88 that is coupled to the upstream housing 16 of the shear valve 10. The rotatable shaft 88 is spring-loaded (not shown) and attached to a fuseable link (not illustrated) contained external to the shear valve 10. When a shearing or other impact occurs on the shear valve 10, the force in the spring is released, causing the two-stage main poppet valve 82 to move upward toward a two-stage main poppet valve seat 90, wherein the two-stage main poppet valve head 84 is pushed securely against the two-stage main poppet valve seat 90. This cuts off the upstream housing flow path 92 from the containment housing flow path 94 so that fuel cannot leak above the upstream housing flow path 92.

A secondary poppet valve 98 is provided in the downstream housing 12 such that when fuel flows through the upstream housing flow path 92 and through the containment housing flow path 94, the force of the fuel flow presses against a secondary poppet head 100 of the secondary poppet valve 98 to push the secondary poppet head 100 upward. This allows the fuel to flow around and out of the outlet 18. In the event of a shear or other impact to the shear valve 10, the shear valve 10 is designed so that the downstream housing 12 will separate from the containment housing 14. In this event, the secondary poppet stem 35 of the secondary poppet valve 98 is pulled downward due to its bias such that the secondary poppet head 100 is pushed securely tight against the secondary poppet valve seat 37. This prevents fuel in fuel piping coupled to the flange 24, outlet 18, and/or and downstream housing flow path 96 from flowing backward into the containment housing flow path 94.

Therefore, as illustrated in FIG. 3, the shear valve 10 provides secondary containment of the fuel flow path formed by the coupling of upstream housing flow path 92 to the containment housing flow path 94 to the downstream housing flow path 96. If a leak occurs in the downstream or upstream housings 16, 12, the leak will be contained in interstitial space 60 formed between these housings 16, 12 and the containment housing 14. Additionally, via interstitial space orifices 40, 62, the interstitial space 60 in the shear valve 10 can be coupled to the interstitial space of piping that is connected to the upstream housing 16 and/or the downstream housing 12, so that the interstitial space 60 of the shear valve 10 and the interstitial space of the fuel piping can be fluidly coupled together to monitor the coupled interstitial space 60 as one continuous space.

Figure 4:
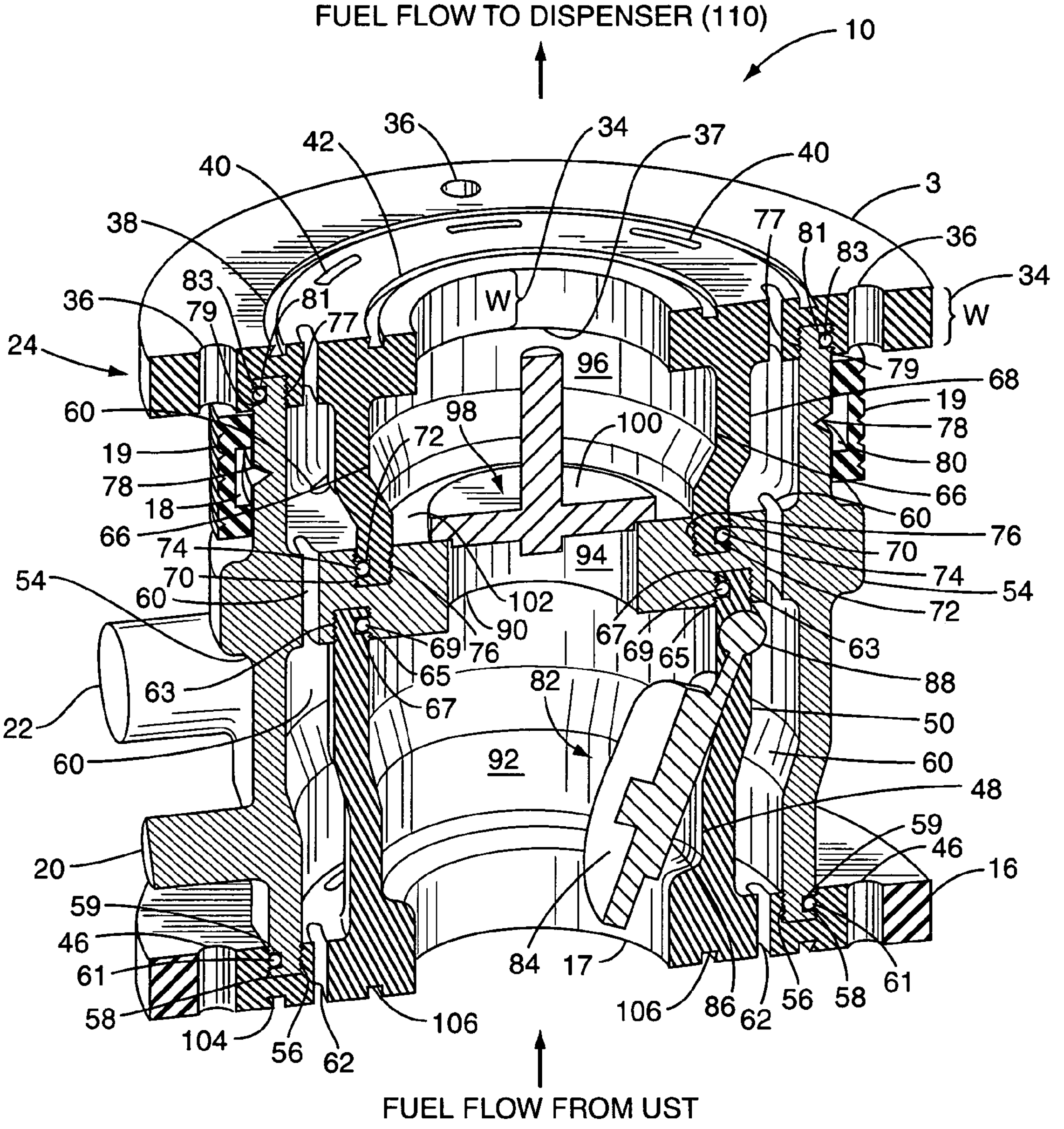
FIG. 4 is an cross section illustration of the shear valve illustrated in FIG. 1 from a top angled view to show the top of the shear valve.

FIG. 4 illustrates the shear valve 10 of FIG. 3 as a cross-section illustration from a top angle view perspective. FIG. 4 does not show any additional elements that are not described and illustrated in FIG. 3; however, the drawing provides a depth perception of the interstitial space 60 and how the interstitial space 60 surrounds the outer wall 50 of the upstream housing 16 and the outer wall 68 of the downstream housing 12.

Figure 5:
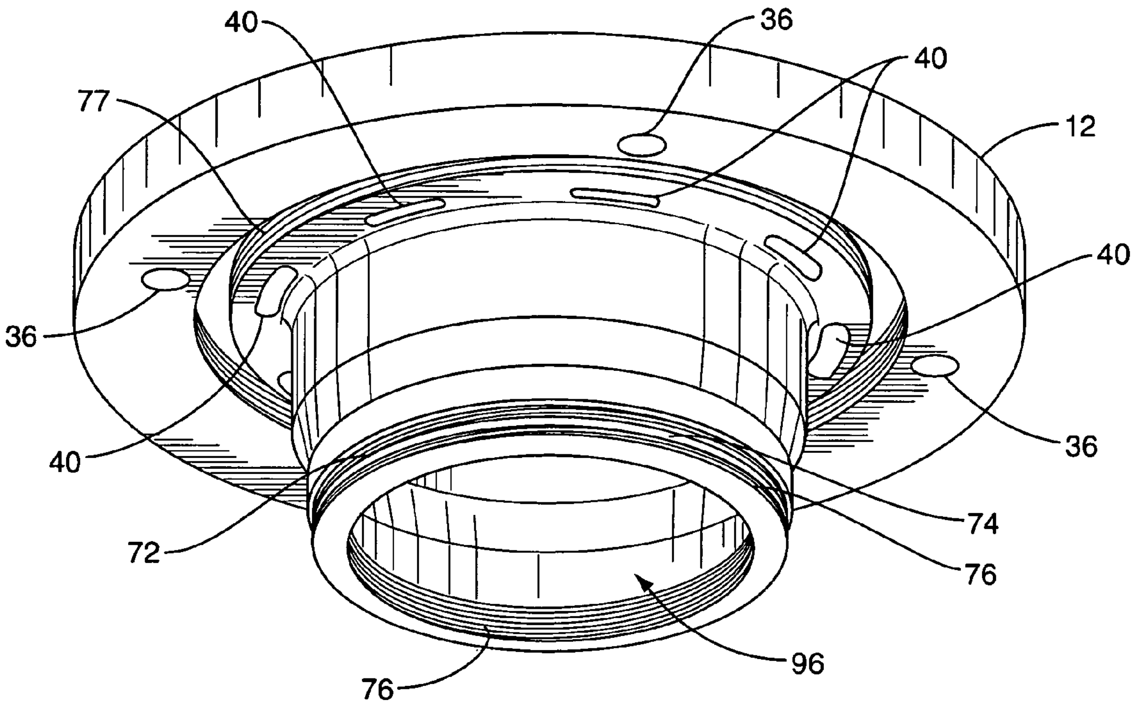
FIG. 5 is a bottom angled view of the downstream housing of the shear valve illustrated in FIGS. 1-4.

FIG. 5 is a bottom angle view of the downstream housing 12 of the shear valve 10 illustrated in the previous figures. Again, all of the elements that form the downstream housing 12 that have been previously illustrated in the preceding figures are shown here and thus are not repeated.

Figure 6:
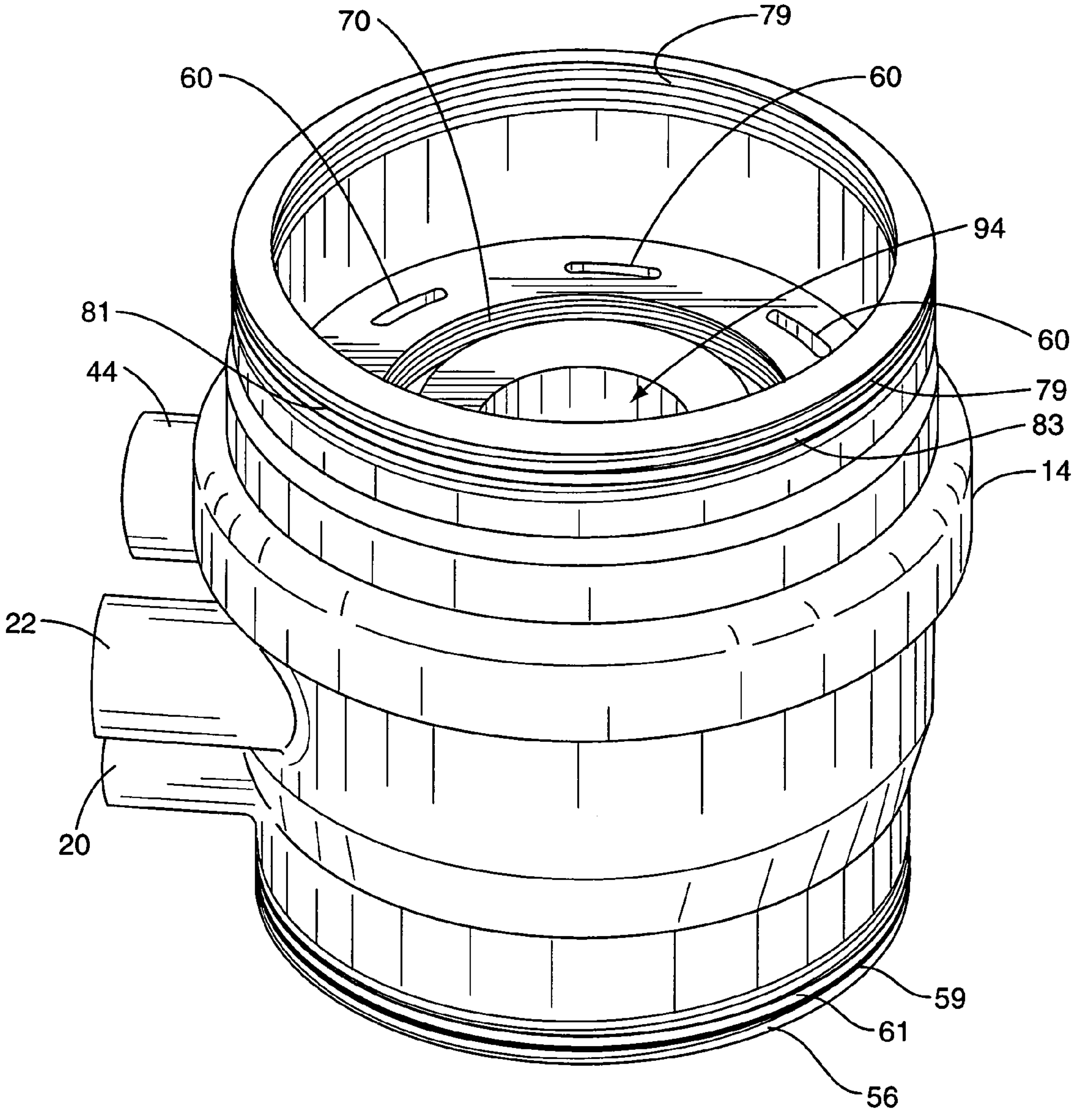
FIG. 6 is an illustration of the containment or outer housing of the shear valve illustrated in FIGS. 1-4.

FIG. 6 illustrates the containment housing 14 of the shear valve 10 from a top angle view perspective to provide an alternative view of the containment housing 14 independent of the upstream housing 16 and downstream housing 12.

Figure 7:
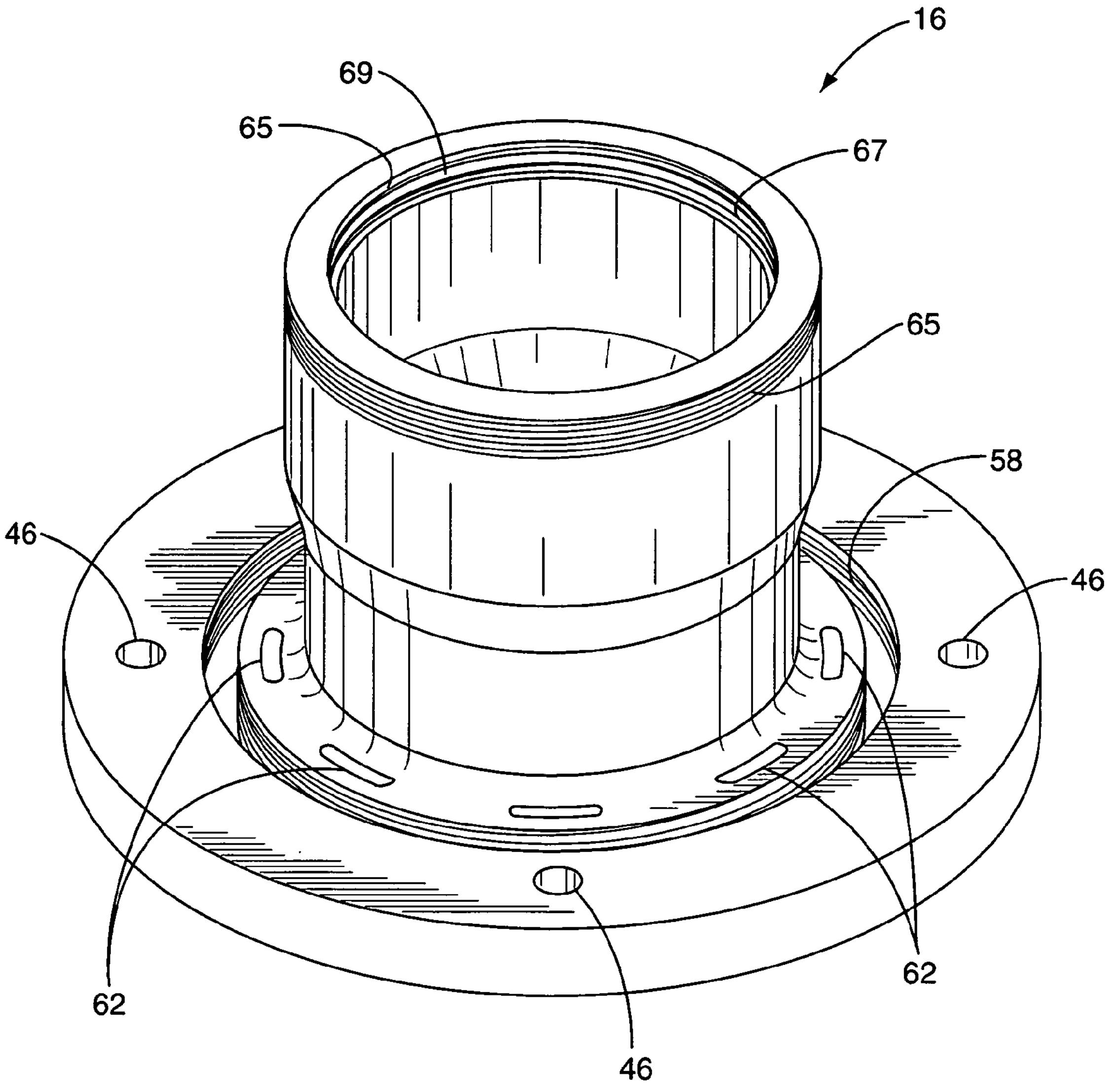
FIG. 7 is a top angled view of the upstream housing of the shear valve illustrated in FIGS. 1-4.

FIG. 7 shows the upstream housing 16 independent of the containment housing 14 and the downstream housing 12, showing aspects that have been previously described in the preceding figures and text.

Figure 8:
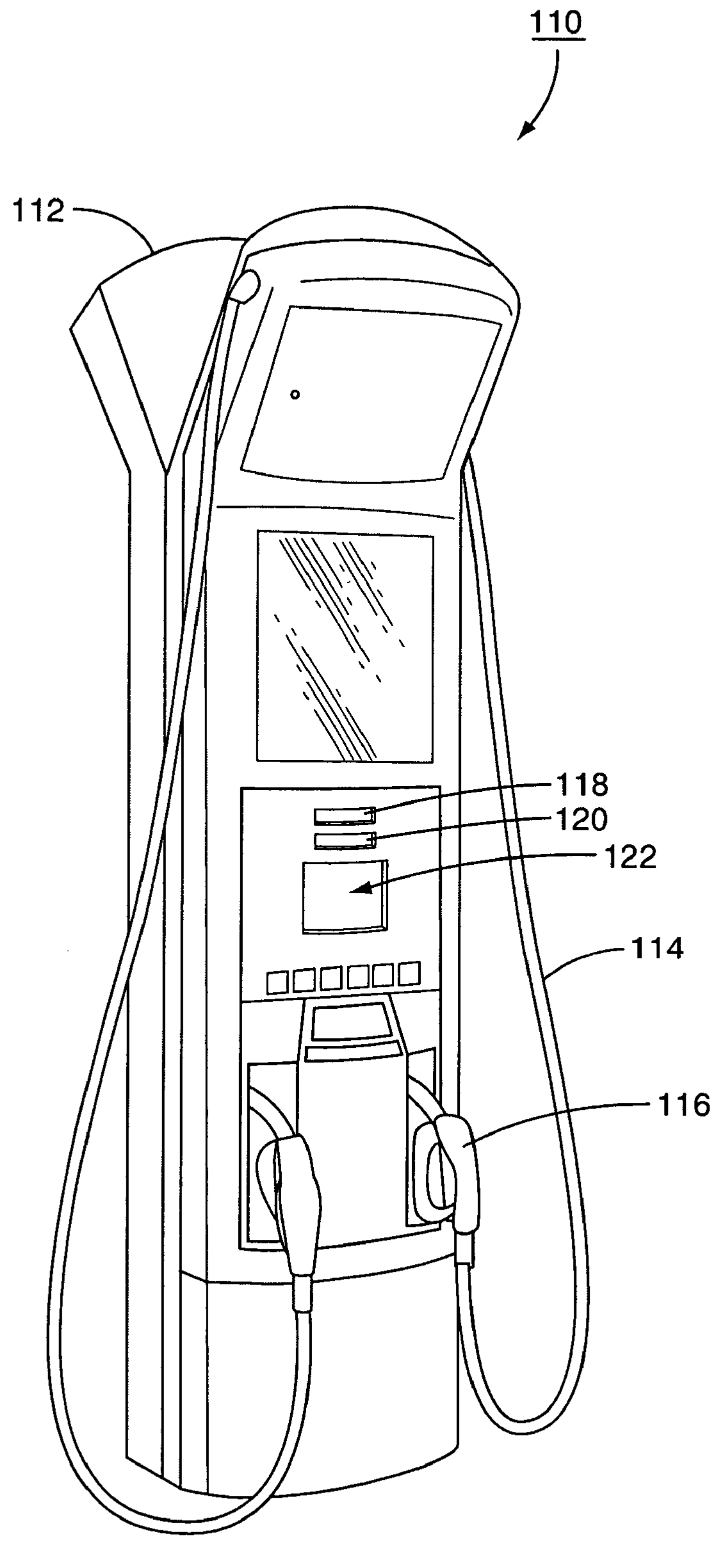
FIG. 8 is an illustration of a fuel dispenser.

FIG. 8 illustrates a fuel dispenser 110 that may be used in conjunction with the shear valve 10 to provide a safety shear valve in the event of an impact to the fuel dispenser 110. The fuel dispenser 110 is being shown as a preferred environmental embodiment and use of the shear valve 10, but the shear valve 10 is not limited to a fuel dispenser application in particular.

The fuel dispenser 110 in FIG. 8 is a typical fuel dispenser that is comprised of a housing 112. A hose 114 and nozzle 116 are provided so that fuel carried internal to the fuel dispenser 110 is dispensed through the hose 114 and through the nozzle 116 into a vehicle fuel tank (not shown). The fuel dispenser 110 contains a price display 118 and a volume display 120, as is typical for a fuel dispenser 110 and is commonly known in the art. The fuel dispenser 110 may also contain an instruction display 122 that provides information and/or instructions to the customer interfacing with the fuel dispenser 110.

Figure 9:
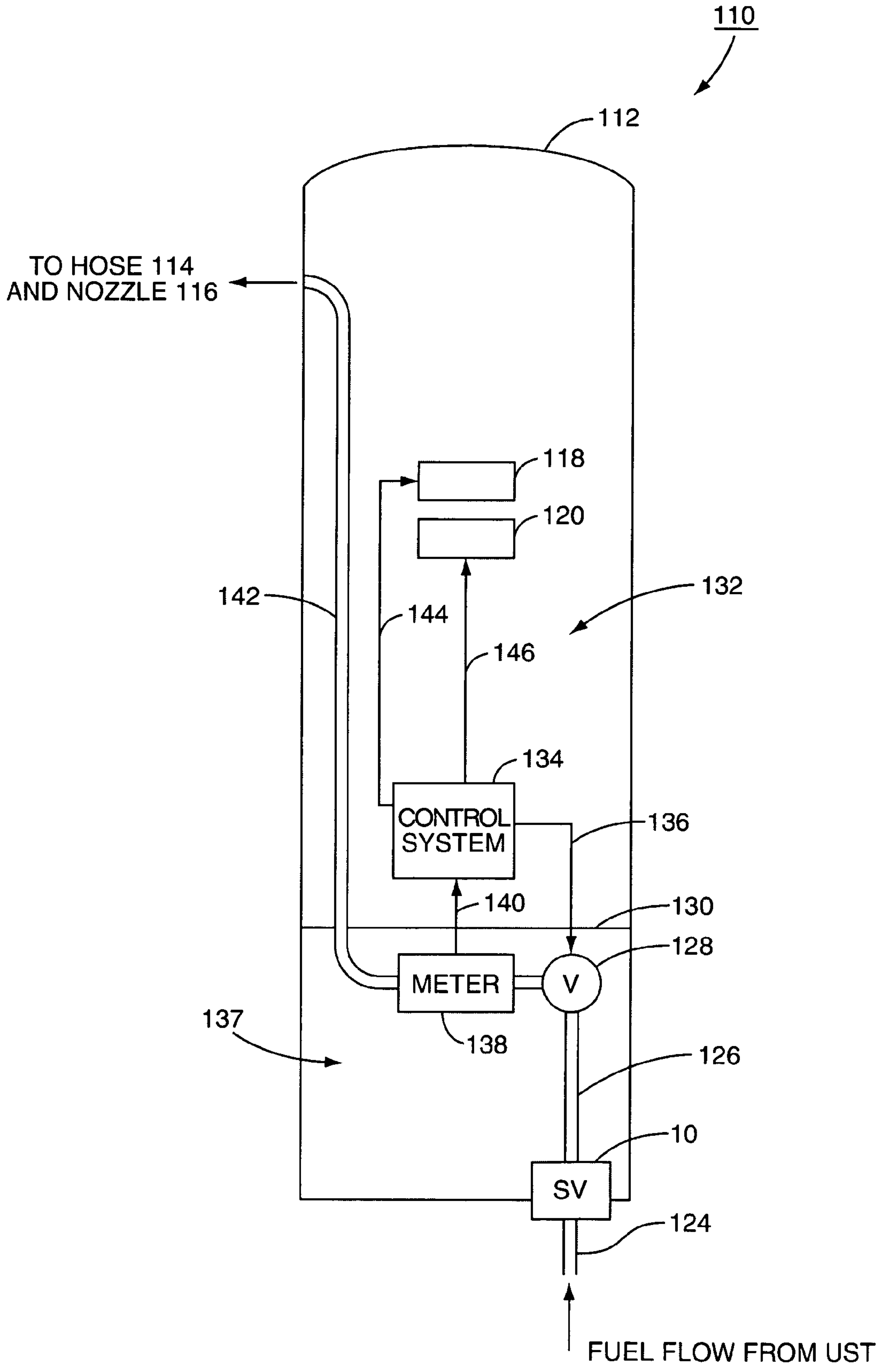
FIG. 9 is an illustration of the fuel dispenser illustrated in FIG. 8 showing the internal components of the fuel dispenser and the interface between the shear valve, the branch fuel piping, and the fuel dispenser internal fuel piping.

FIG. 9 contains an internal view of some of the components that may be contained inside the fuel dispenser 110, and also illustrates how the shear valve 10 may be used with the fuel dispenser 110. As illustrated in FIG. 9, branch fuel piping 124, which is double-walled fuel piping, extends into the inlet 17 of the shear valve 10 as previously described. In this manner, fuel flowing from the UST from the main fuel piping (not shown) that is coupled to the branch fuel piping 124 is connected to the shear valve 10 so that fuel flows through the flow path 92, 94, 96 internal to the shear valve 10.

After the fuel exits the outlet 18 of the shear valve 10, it encounters internal fuel dispenser piping 126 to the fuel dispenser 110 so that the fuel is carried to various components internal to the fuel dispenser 110 for eventual delivery to the hose 114 and nozzle 116 and into a vehicle's fuel tank. Again, the internal fuel dispenser piping 126 may be double-walled piping, such that connection to the shear valve 10 provides for the interstitial space of the internal fuel dispenser piping 126 to be coupled to the interstitial space 60 of the shear valve 10, which may be coupled to the interstitial space of the branch fuel piping 124 for the purposes previously described.

After the fuel enters into the internal fuel dispenser piping 126, it may encounter a flow control valve 128 and meter 138. The flow control valve 128 is under the control of a control system 134 via a valve control signal line 136. In this manner, the control system 134 can control the opening and closing of flow control valve 128 to either allow fuel to flow or not flow through the meter 138 and on to the hose 114 and nozzle 116. The control system 134 typically instructs the flow control valve 128 to open when a fueling transaction is proper and allowed to be initiated.

The flow control valve 128 is contained below a vapor barrier 130 in a hydraulics area 137 of the fuel dispenser 110 where Class 1, Division 1 components are provided for safety reasons and in an intrinsically safe manner, as described in U.S. Pat. No. 5,717,564, incorporated herein by reference in its entirety. Control system 134 is typically located in a compartment of the fuel dispenser 110 above the vapor barrier 130 that does not have to be provided in an intrinsically safe housing. After the fuel exits the flow control valve 128, the fuel typically encounters the meter 138 wherein the fuel flows through the meter 138, and the meter 138 measures the volume and/or flow rate of the fuel. The meter 138 typically contains a pulser (not shown) that generates a pulser signal 140 to the control system 134, indicative of the volume and/or flow rate of fuel. In this manner, the control system 134 can update the price display 118 and the volume display 120, via a price display signal line 144 and a volume display signal line 146, so that the customer is informed of the price to be paid for the fuel as well as the volume of fuel dispensed.

After the fuel exits the meter 138, the fuel is carried in more internal fuel flow piping 142, which is then coupled to the hose 114 typically located in the upper housing or canopy of the fuel dispenser 110 and on to the nozzle 116, as is well known to one of ordinary skill in the art.

In this manner, by the shear valve 10 having the interstitial space 60, as described above, leaks or breaches in the housings 12, 16 of the shear valve 10 are contained in the interstitial space 60 formed by the containment housing 14. Further, the interstitial space orifices 40, 62 being coupled to the interstitial space 60 of the shear valve 10, allows coupling of the interstitial space 60 to the interstitial space of the branch fuel piping 124, so that the interstitial space of the internal fuel dispenser piping 126 can be coupled to the interstitial space of the branch fuel piping 124, through the shear valve interstitial space 60. This provides one continuous interstitial space between the interstitial spaces of the branch fuel piping 124, the shear valve 10, and the internal fuel dispenser piping 126 so that the continuous space can be monitored as one space for leak prevention and/or detection.

Figure 10:
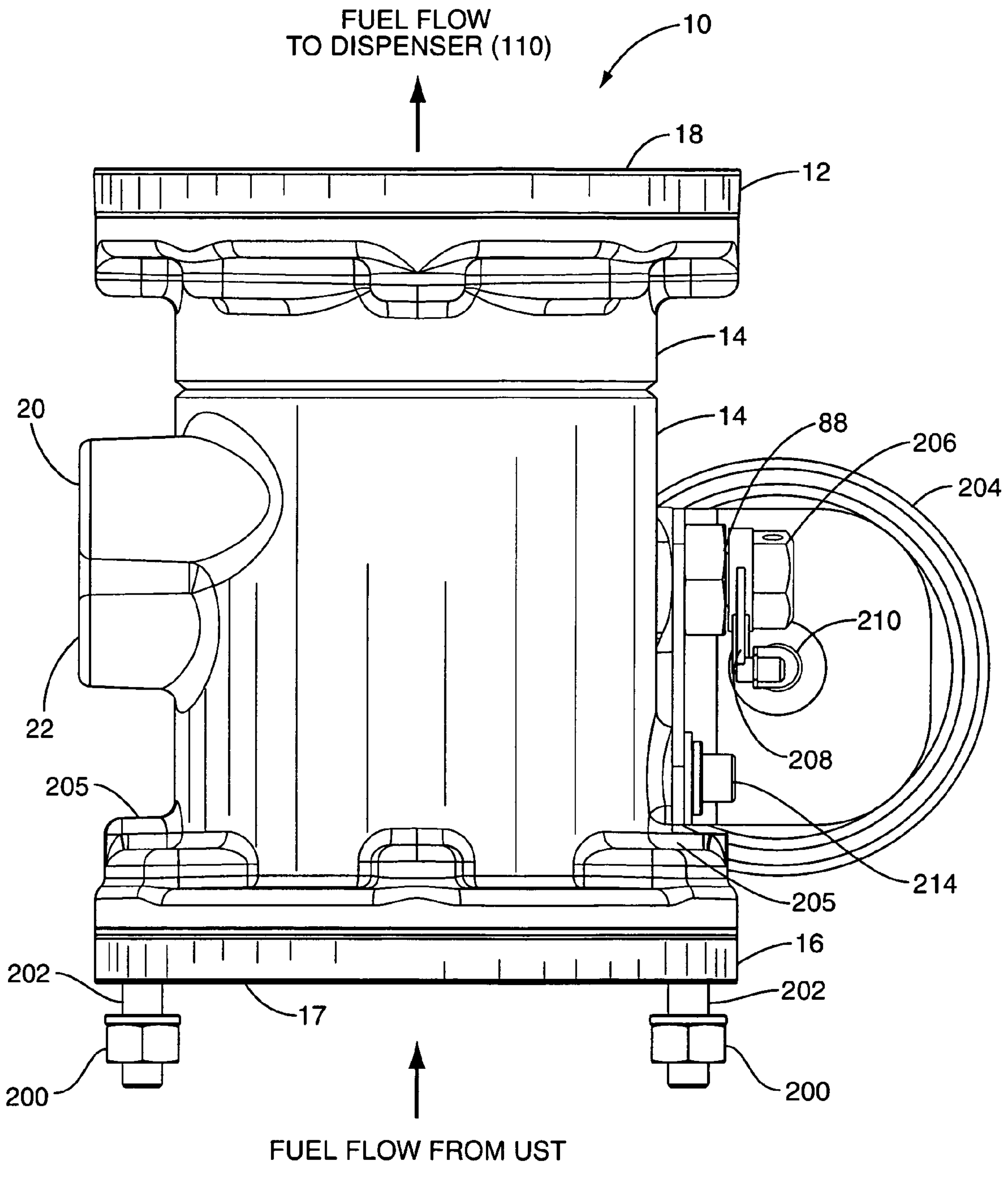
FIG. 10 is an illustration of a second embodiment of the double-walled contained shear valve.

FIG. 10 illustrates an alternative embodiment of the double-walled contained shear valve 10. The double-walled shear valve 10 in FIG. 10 is illustrated from a front view. Similar to the shear valve 10 illustrated in FIGS. 1-9, the double-walled shear valve 10 in FIG. 10 is comprised of the downstream housing 12 coupled to the outer housing or containment housing 14. The containment housing 14 is coupled to the upstream housing 16. An orifice (not shown in FIG. 10) in the upstream housing 16 provides the inlet 17 to receive fuel from a branch or main fuel piping carrying fuel from a storage tank. The fuel is carried through an internal fuel flow path of the double-walled shear valve 10. The fuel exits the shear valve 10 through the outlet 18 formed by the orifice 26 (shown in FIGS. 12 and 14) within the downstream housing 12. The mounting bosses 20, 22 are attached or provided as part of the containment housing 14 to mount the double-walled shear valve 10 in place when installed in the field.

Figure 11:
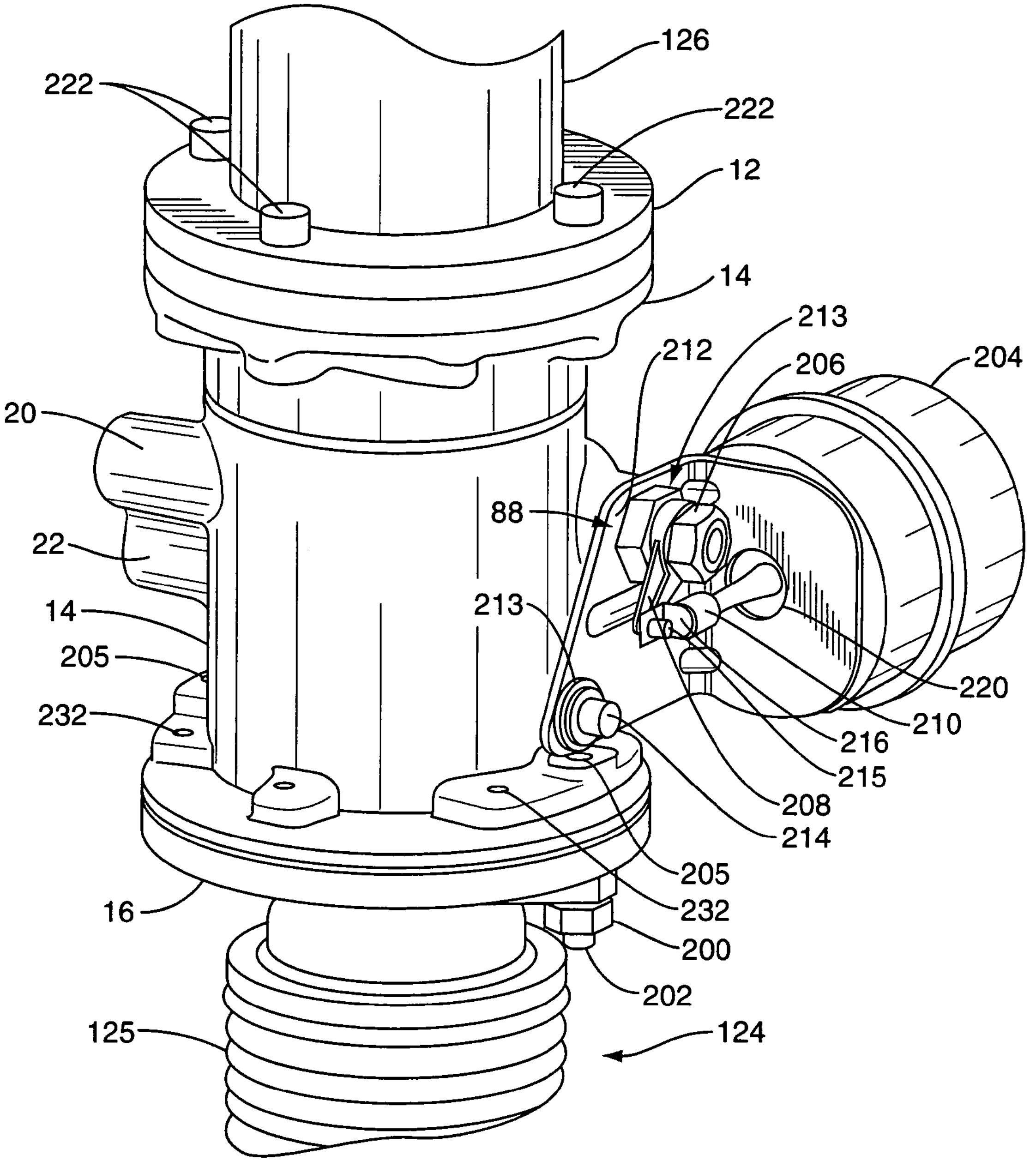
FIG. 11 is an illustration of the shear valve illustrated in FIG. 10 attached to fuel piping.

As illustrated in FIG. 10 and more particularly in FIG. 11, the shear valve 10 may be fitted with a vacuum actuator 204. The vacuum actuator 204 is coupled to the interstitial space 60 (illustrated in FIG. 12) of the shear valve 10. The vacuum actuator 204 is designed to apply a rotational force to the rotatable shaft 88 to open and close the two-stage main poppet valve 82 in response to generation or loss of a vacuum level in the interstitial space 60 within the shear valve 10 or other system having a separate interstitial space (not shown). This separate interstitial space may be internal fuel dispenser piping 126, branch fuel piping 124, main fuel piping (not shown), a containment sump (not shown) or any other fuel-handling component where a loss of vacuum is indicative of a possible leak. The vacuum actuator 204 is comprised of an internal vacuum actuation device (not shown) that retracts a vacuum actuator shaft 210 from a vacuum actuator orifice 220 in response to generation of a sufficient vacuum level. The vacuum actuator 204 is attached to the containment housing 14 of the shear valve 10 via a vacuum actuator mounting plate 212. The vacuum actuator mounting plate 212 contains two mounting orifices 213. A mounting bolt 214 is placed inside one mounting orifice 213 to secure the plate 212 to the containment housing 14. The rotatable shaft 88 that protrudes the containment housing 14 fits inside the other orifice 213 and is secured using another mounting bolt 216.

The vacuum actuator shaft 210 is coupled to an attachment means 216 that is attached to a lever 208 attached to the rotatable shaft 88. The rotatable shaft 88 is spring biased in a clockwise rotational direction. When a sufficient vacuum level is generated, the vacuum actuator 204 pulls the vacuum actuator shaft 210 inward, thereby causing the rotatable shaft 88 to rotate counter-clockwise. This opens the two-stage main poppet valve 82 inside the fuel flow path within the shear valve 10 to allow fuel flow. When the vacuum level is sufficiently lost in the interstitial space 60, the vacuum actuator 204 moves the vacuum actuator shaft 210 outward thereby releasing the energy in the spring biased rotatable shaft 88, causing it to rotate clockwise. This closes the two-stage main poppet valve 82 inside the fuel flow path of the shear valve 10, thereby cutting off fuel flow. This is because loss of vacuum level in the interstitial space 60 in the shear valve 10 is indicative of a leak in either the upstream housing 16, the downstream housing 12, or the containment housing 14, which may be due to a shear. Alternatively, as discussed above, the loss of vacuum may be in another system where it is desired to close the shear valve 10 in response for safety reasons. It is desired to automatically close the two-stage main poppet valve 82 to close the fuel flow path in the shear valve 10 when a leak is detected in the form of a vacuum level loss.

The double-walled shear valve 10 illustrated in FIG. 11 is attached to the branch fuel piping 124, as well as the internal fuel dispenser piping 126. The branch fuel piping 124 may include a flex connection piping portion 125 to allow flexibility when attaching the branch fuel piping 124 to the double-walled shear valve 10 in the field. Fuel flow from the storage tank (not shown) travels through fuel piping, eventually reaching the branch fuel piping 124. From there, the fuel enters into the double-walled shear valve 10 and exits through the downstream housing 12 and into a fuel flow path internal to the internal fuel dispenser piping 126 when the two-stage main poppet valve 82 and the secondary poppet valve 98 are open. The internal fuel dispenser piping 126 is attached to the downstream housing 12 of the double-walled shear valve 10 via fasteners 222. The branch fuel piping 124 is attached to the upstream housing 16 of the double-walled shear valve 10 via fasteners 200 that are fitted into orifices 205 and secured tightly via bolts 202 (see FIG. 10 as well).

Figure 12:
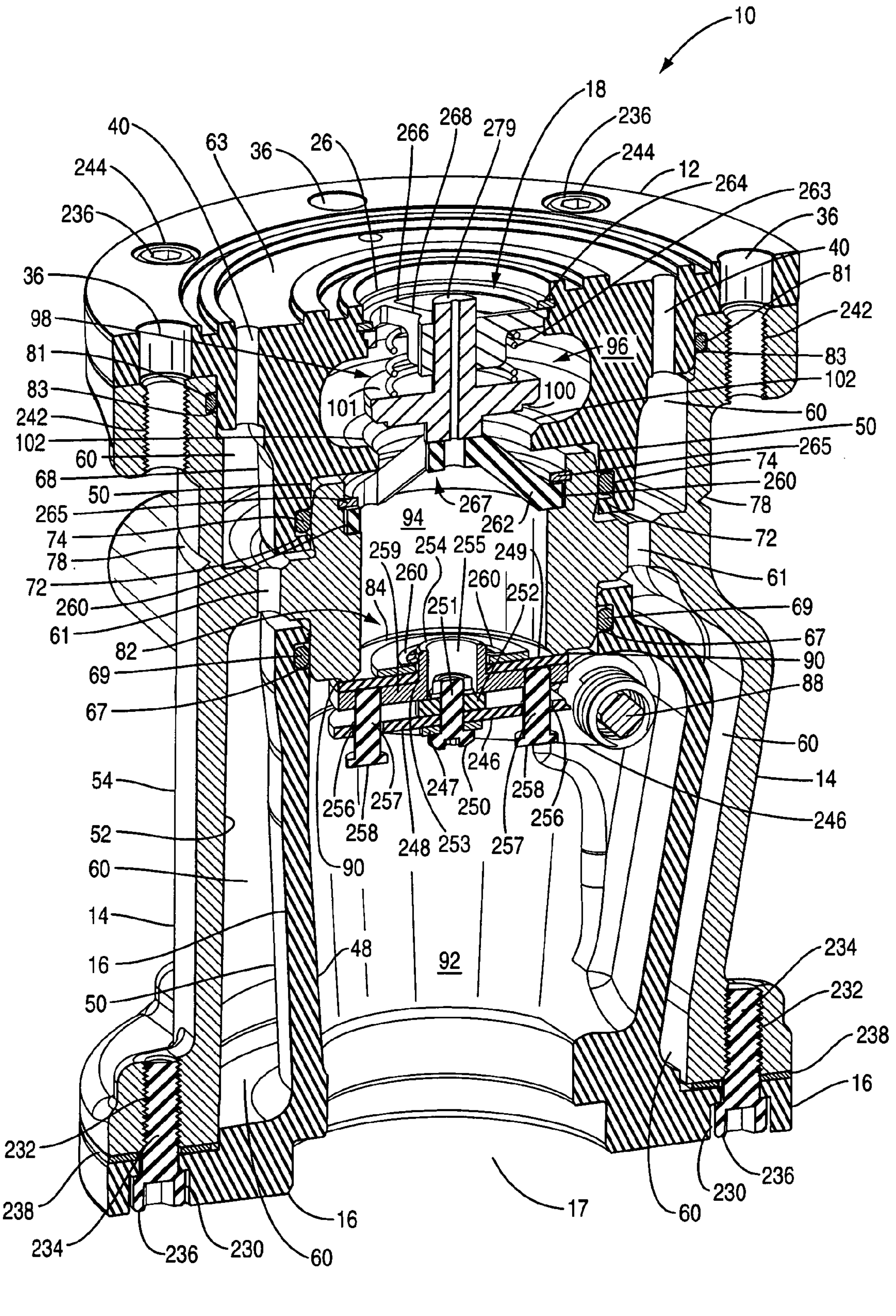
FIG. 12 is a cross section illustration of the shear valve illustrated in FIG. 10 with the two-stage main poppet valve closed to disallow fuel flow in response to a shear or loss of vacuum.

FIG. 12 illustrates a cross-sectional view of the double-walled shear valve 10 as illustrated in FIG. 10. The upstream housing 16 is comprised of a uniform body that contains an internal orifice forming the upstream housing flow path 92. The thickness of the material comprising the upstream housing 16 provides an inner wall 48 and an outer wall 50. Similarly, the outer or containment housing 14 contains an orifice forming a containment housing flow path 94, wherein the thickness of the containment housing 14 forms an inner wall 52 and an outer wall 54.

The containment housing 14 is secured to the upstream housing 16 by a threaded orifice 232 and fastener 234 fitted into a slot 230 in the upstream housing 16 for a flush mount attachment. The fastener 234 is threaded and contains a fastener head 236 for fastenably rotating the fastener 234 into the threaded orifice 232. An o-ring seal 238 is provided around the threaded orifice 232 to provide a tight seal between the upstream housing 16 and the containment housing 14 when securely attached to each other.

When the upstream housing 16 is attached to the containment housing 14, an indention or notch 67 in the inner wall 48 of the upstream housing 16 rests against the containment housing 14. The notch 67 is located around the circumference of the inner wall 48 of the upstream housing 16. An o-ring seal 69 is placed inside the notch 67 to provide a tight seal between the top of the upstream housing 16, where the inner wall 48 of the upstream housing 16 abuts against the containment housing 14.

Similarly, the downstream housing 12 is securely attached to the containment housing 14 via a fastener orifice 242 provided in the containment housing 14. A fastener 290 (illustrated in FIG. 18) is placed inside one of the orifices 36 in the downstream housing 12 aligned with the fastener orifice 242. The fastener 290 is threaded and is screwed into the fastener orifice 242 to securely attach the downstream housing 12 to the containment housing 14. Similar to notch 67, the containment housing 14 contains an indention or notch 81 located around the circumference of the containment housing 14, where the inner wall 52 of the containment housing 14 abuts the downstream housing 12. An o-ring seal 83 is placed inside the notch 81 to provide a tight seal.

The downstream housing 12 also has an indention or notch 72 located around the circumference of the inner wall of the downstream housing 12. An o-ring seal 74 is placed inside the notch 72 to provide a tight seal between the inner wall 66 of the downstream housing 12 and the outer wall 50 of the containment housing 14.

When the upstream housing 16 and the downstream housing 12 are secured to the containment housing 14 in this manner, an interstitial space 60 is formed between the outer wall 50 of the upstream housing 16 and the inner wall 52 of the containment housing 14. The containment housing 14 provides an interstitial space orifice 61 that is fluidly coupled to the interstitial space 60 formed between the inner wall 52 of the containment housing 14 and the outer wall 68 of the downstream housing 12. In this manner, one contiguous interstitial space 60 surrounds the outer wall 50 of the upstream housing 16 and the outer wall 68 of the downstream housing 12 (i.e. the fuel flow paths 92, 94, 96) to contain leaks and/or to allow vacuum or pressure level monitoring of the interstitial space 60.

The containment housing 14 also contains the shear groove 78 along the circumference of the outer wall 54 to provide a shearing point for the double-walled shear valve 10 to break or shear in a controlled fashion when impacted. In the event of a shear at the shear groove 78, fuel captured inside the interstitial space 60 may leak outside the containment housing 14 through the shear groove 78. Therefore, although not illustrated in FIG. 12, the leak skirt 19 like that illustrated in the double-walled shear valve 10 of FIG. 3 may be provided, although not required.

The downstream housing 12 contains an orifice that forms a downstream housing fuel flow path 96. The downstream housing fuel flow path 96 is fluidly coupled to the containment housing flow path 94 and the upstream housing flow path 92 when the two-stage main poppet valve 82 and the secondary poppet valve 98 are open. The fuel flow paths 92, 94, 96 form one flow path to allow fuel to flow from the branch fuel piping 124 through the shear valve 10 and out to the internal fuel dispenser piping 126 during normal operation.

The double-walled shear valve 10 contains the two-stage main poppet valve 82 that controls opening and closing of the upstream housing flow path 92 to the containment housing flow path 94 to allow fuel to flow therethrough. The two-stage main poppet valve 82 is comprised of the two-stage main poppet valve head 84 that rests against the two-stage main poppet valve seat 90 formed around the orifice in the containment housing 14 forming the containment housing fuel flow path 94. When the two-stage main poppet valve 82 is closed, fuel flow is prevented from flowing from the upstream housing fuel flow path 92 to the containment housing fuel flow path 94.

One aspect of the invention and the shear valve 10 illustrated in FIG. 12 provides an improved two-stage main poppet valve 82 that requires less force to open. This is particularly important when using the vacuum actuator 204 to automatically apply a rotational force to the rotatable shaft 88 to open the two-stage main poppet valve 82 when a sufficient vacuum level is restored in the interstitial space 60. The vacuum actuator 204 may not be able to generate enough rotational force to rotate the rotatable shaft 88 when a large pressure differential exists across the two-stage main poppet valve 82. Or, using the vacuum actuator 204 with greater force ranges may be too expensive for practical inclusion in the shear valve 10. However, there may be other reasons for desiring to employing the two-stage main poppet valve 82, even if the vacuum actuator 204 is not employed.

For example, if there is pump pressure trapped in the upstream stream housing fuel flow path 92 and little or no pressure or atmospheric pressure in the containment housing fuel flow path 94, a large force is required open the two-stage main poppet valve 82. It would not be uncommon for a 50 p.s.i. pressure drop to be present across the two-stage main poppet valve 82. Depending on the diameters, areas of the two-stage main poppet valve head 84 could have anywhere from 1.7 to 2.0 times 50 psi of force required to move the two-stage main poppet valve head 84 away from the two-stage main poppet valve seat 90 to thereby open the two-stage main poppet valve 82.

The two-stage main poppet valve 82 is designed to open in two stages. In a first stage, an opening or port across the two-stage main poppet valve 82 is opened to allow the pressure differential across the two-stage main poppet valve 82 to equalize. Thereafter, because of this pressure equalization, less force is required to open the two-stage main poppet valve 82 in a second stage. The opening or port may be part of the two-stage main poppet valve 82 itself.

In one embodiment, in order to provide a two-stage main poppet valve 82 that can be opened with less force, so that a sufficient and/or less expensive vacuum actuator 204 may be used to open the two-stage main poppet valve 82, the two-stage main poppet valve 82 includes the two-stage main poppet valve head 84 that is attached to a two-stage main poppet valve support 259. The two-stage main poppet valve support 259 contains a two-stage main poppet valve support orifice 253 formed by an inner diameter tube 254 formed as part of the same component. The inner diameter tube 254 has an inner diameter orifice 255 coupled to the containment housing fuel flow path 94. An inner diameter seal 252 seals off the inner diameter orifice 255 from the upstream housing fuel flow path 92. The two-stage main poppet valve head 84 is attached around the circumference of the inner diameter tube 254 via a retaining ring 260. The inner diameter seal 252 rests against, but is unconnected, to the two-stage main poppet valve support 259 and is attached to a flapper 246 via a washer 247 and attachment means 250. When the inner diameter seal 252 is cracked, the pressure differential between the containment housing fuel flow path 94 and the upstream housing fuel flow path 92 starts to equalize. Thereafter, it is easier and requires less force to lift the two-stage main poppet valve head 84 off of the two-stage main poppet valve seat 90 to open the two-stage main poppet valve 82.

The flapper 246 is attached to the rotatable shaft 88. The flapper 246 is comprised of a flapper ledge 248 containing two flapper orifices 256 that surround two two-stage main poppet valve shafts 257 mounted perpendicularly to the two-stage main poppet valve support 259. When the flapper 246 rotates in a counter-clockwise direction, via the vacuum actuator 204 rotating the rotatable shaft 88 in a counter-clockwise direction, the flapper 246 and its flapper orifices 256 move down about the two-stage main poppet valve shafts 257. This causes the inner diameter seal 252 to open first, lifting down off of the two-stage main poppet valve support 259 and opening the two-stage main poppet valve support orifice 253. This couples the inner diameter orifice 255 to the upstream housing fuel flow path 92 to begin to equalize any pressure differential between the containment housing fuel flow path 94 and the upstream housing fuel flow path 92. Less force is required to overcome the pressure differential between the inner diameter orifice 255 and the upstream housing fuel flow path 92 than would otherwise be required to overcome the pressure differential between the containment housing fuel flow path 94 and the upstream housing fuel flow path 92.

Thus, providing the inner diameter orifice 255 reduces this pressure differential and allows a less powerful vacuum actuator 204 to open the inner diameter seal 252. Thereafter, the flapper 246 continues to rotate counter-clockwise until the flapper ledge 248 rests against protruding portions 258 of the two-stage main poppet valve support 259. Once this occurs, the two-stage main poppet valve shaft 257 pulls against the two-stage main poppet valve seat 90, thereby pulling the two-stage main poppet valve head 84 away from the two-stage main poppet valve seat 90 to open the two-stage main poppet valve 82. Opening the two-stage main poppet valve 82 couples the upstream housing fuel flow path 92 to the containment housing fuel flow path 94 to allow fuel to flow through the shear valve 10.

Figure 13:
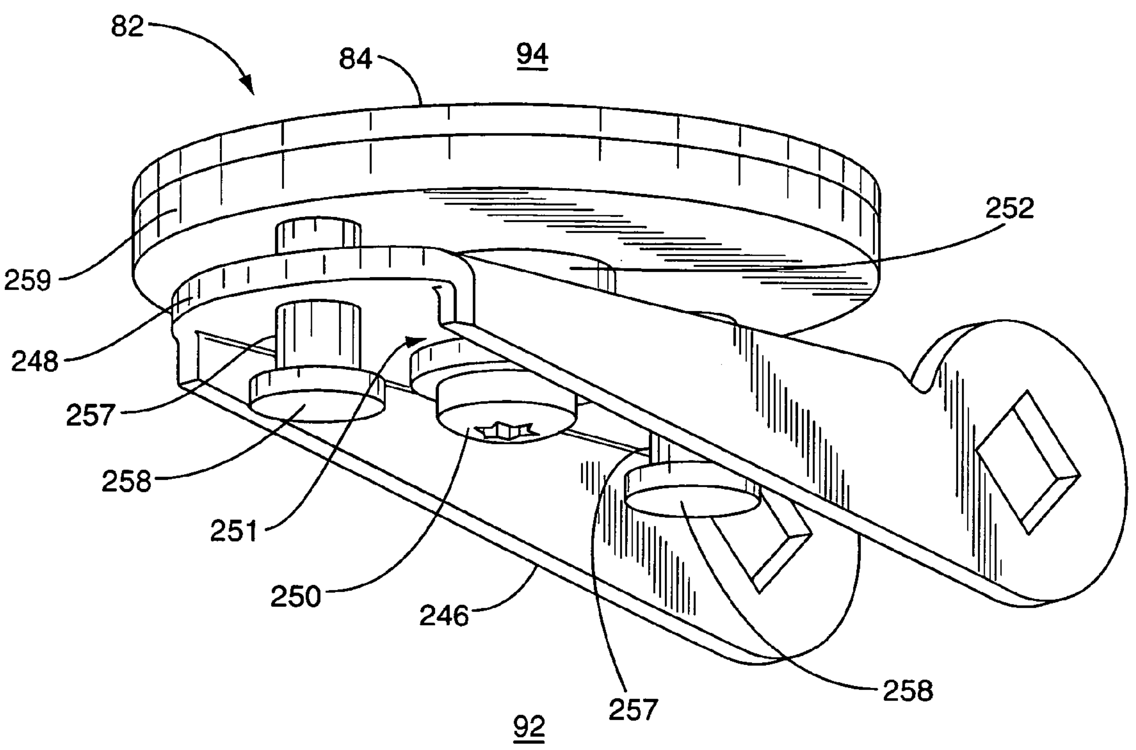
FIG. 13 is an illustration of the vacuum actuator linkage mechanism to open and close the two-stage main poppet valve of the shear valve illustrated in FIG. 10.
Figure 14:
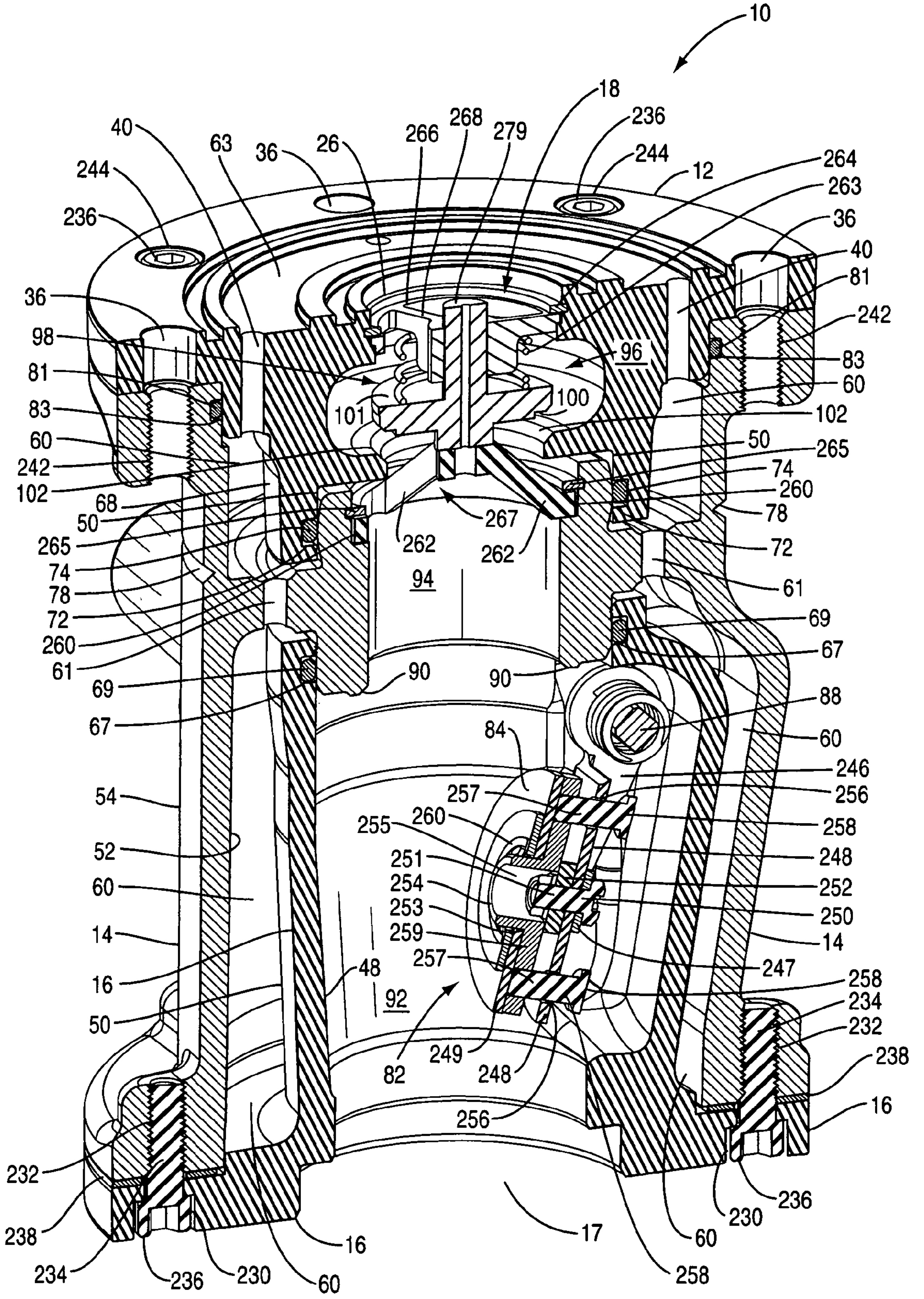
FIG. 14 is a cross section illustration of the shear valve illustrated in FIG. 10 with the two-stage main poppet valve open to allow fuel flow.

FIG. 13 illustrates the flapper 246 in larger detail. As shown, the flapper ledge 248 will eventually contact and push downward on the two-stage main poppet valve shaft protrusions 258 after the inner diameter seal 252 is opened. Because the inner diameter seal 252 has opened, thereby opening the two-stage main poppet valve support orifice 253 and coupling the containment housing fuel flow path 94 to the upstream housing fuel flow path 92, less force is required to be applied by the flapper ledge 248 to pull down on the two-stage main poppet valve support 259, thereby pulling the two-stage main poppet valve head 84 from the two-stage main poppet valve seat 90 to open the two-stage main poppet valve 82. FIG. 14 illustrates the two-stage main poppet valve 82 fully opened.

Turning back to FIG. 12, after the fuel reaches the containment housing fuel flow path 94 due to the two-stage main poppet valve 82 being opened, the fuel flow next encounters a conical rib support 262 that contains orifices 267 there around to allow fuel flow to pass therethrough. The conical rib support 262 props open the secondary poppet valve 98 to allow fuel flow to pass therethrough and into the downstream housing fuel flow path 96 for eventual exit out of the outlet 18 of the double-walled shear valve 10. The conical rib support 263 is supported by the containment housing 14. The legs of the conical rib support 263 rest and are contained inside the indention or notch 281 that is located around the circumference of the containment housing 14 in the containment housing fuel flow path 94. A retaining ring 265 holds the conical rib support 262 in place.

The secondary poppet valve 98 contains a secondary poppet support 101 having a perpendicular shaft member 279 that rests against a spring 263. The spring 263 rests between the secondary poppet support 101 and a stop or upstream housing retaining member 266 comprised of ribs 268 providing orifices to allow fuel to flow therethrough. The stop 266 is held in place via an indention or notch 264 that is contained along the circumference of the downstream housing 12 in the downstream housing fuel flow path 96. The shaft member 279 protrudes through and moves along a center orifice within the retaining member 266. The secondary poppet head 100 is designed to rest against a secondary poppet seat 102 when the secondary poppet valve 98 is closed. The conical rib support 262 pushes upward against the secondary poppet valve 98 to extend its shaft 279 upward to keep the secondary poppet valve 98 open and from resting against the secondary poppet valve seat 102, thereby coupling the containment housing fuel flow path 94 to the upstream housing fuel flow path 92. The conical rib support 262 will remain with the containment housing 14 in either a damaged or undamaged state in the event of a complete shear or separation of the downstream housing 12 from the containment housing 14. In either event, such separation will cause the secondary poppet valve 98 to be pushed downward to rest against the secondary poppet valve seat 102 to close the secondary poppet valve 98. In this manner, fuel resident in the downstream housing fuel flow path 96 or in the fuel dispenser piping 126 coupled to the shear valve 10 will not flow back past the secondary poppet valve 98, and thus possibly leak through the damaged shear valve 10 or shear groove 78 when a shear or other impact occurs.

Figure 15:
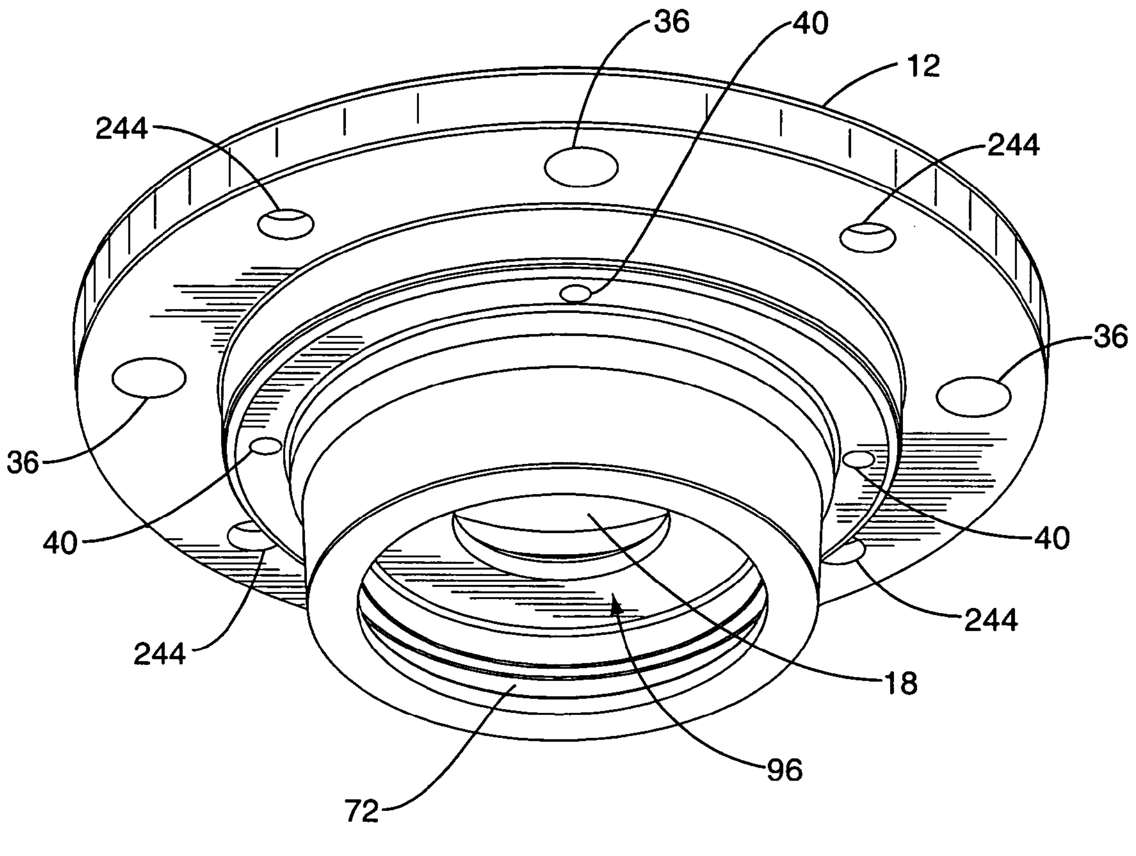
FIG. 15 is an illustration of the downstream housing of the shear valve illustrated in FIG. 10.

FIG. 15 illustrates a perspective view of the downstream housing 12 of the double-walled shear valve 10 illustrated in FIGS. 10 through 14. The upstream housing 16 and containment housing 14 are not attached to the downstream housing 12 in this figure.

As illustrated, the outlet 18 is provided to allow fuel to flow therethrough through the downstream housing 12 and to exit the double-walled shear valve 10. The interstitial space orifices 40 are shown such that when the downstream housing 12 is attached to the containment housing 14, the interstitial space orifices 40 are fluidly coupled to the interstitial space 60 provided between the outer wall 68 of the downstream housing 12 and the inner wall 52 of the containment housing 14. The orifices 36 are provided in the downstream housing 12 to attach the downstream housing 12 to fuel dispenser piping 126, as illustrated in FIG. 11. The fasteners 222 are inserted into the orifices 36 to secure the two together as illustrated in FIG. 11.

Figure 16:
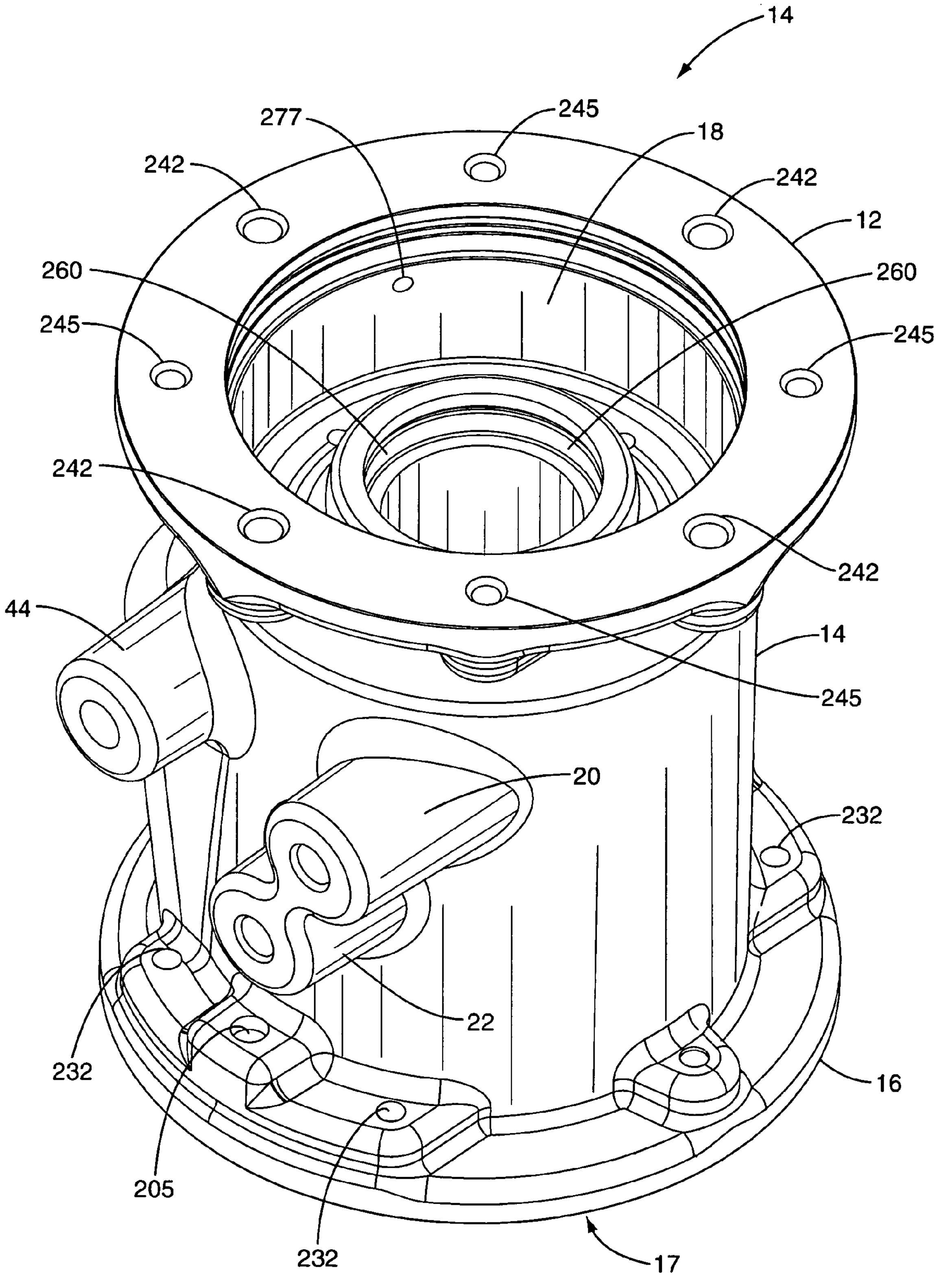
FIG. 16 is an illustration of the containment or outer housing of the shear valve illustrated in FIG. 10.

FIG. 16 illustrates a perspective view of the containment housing 14 of the double-walled shear valve 10 illustrated in FIGS. 10 through 14. The third mounting boss 44 is shown in this figure. The upstream housing 16 and the downstream housing 12 are not attached to the containment housing 14 in this figure. A port 277 is provided through the body of the containment housing 14 to allow coupling via a tube or pipe (not shown) to the interstitial space 60 for vacuum or pressure level monitoring purposes, as previously discussed above. The fastener orifices 242 that receive fasteners 290 (see FIG. 18) via the orifices 36 are illustrated.

Figure 17:
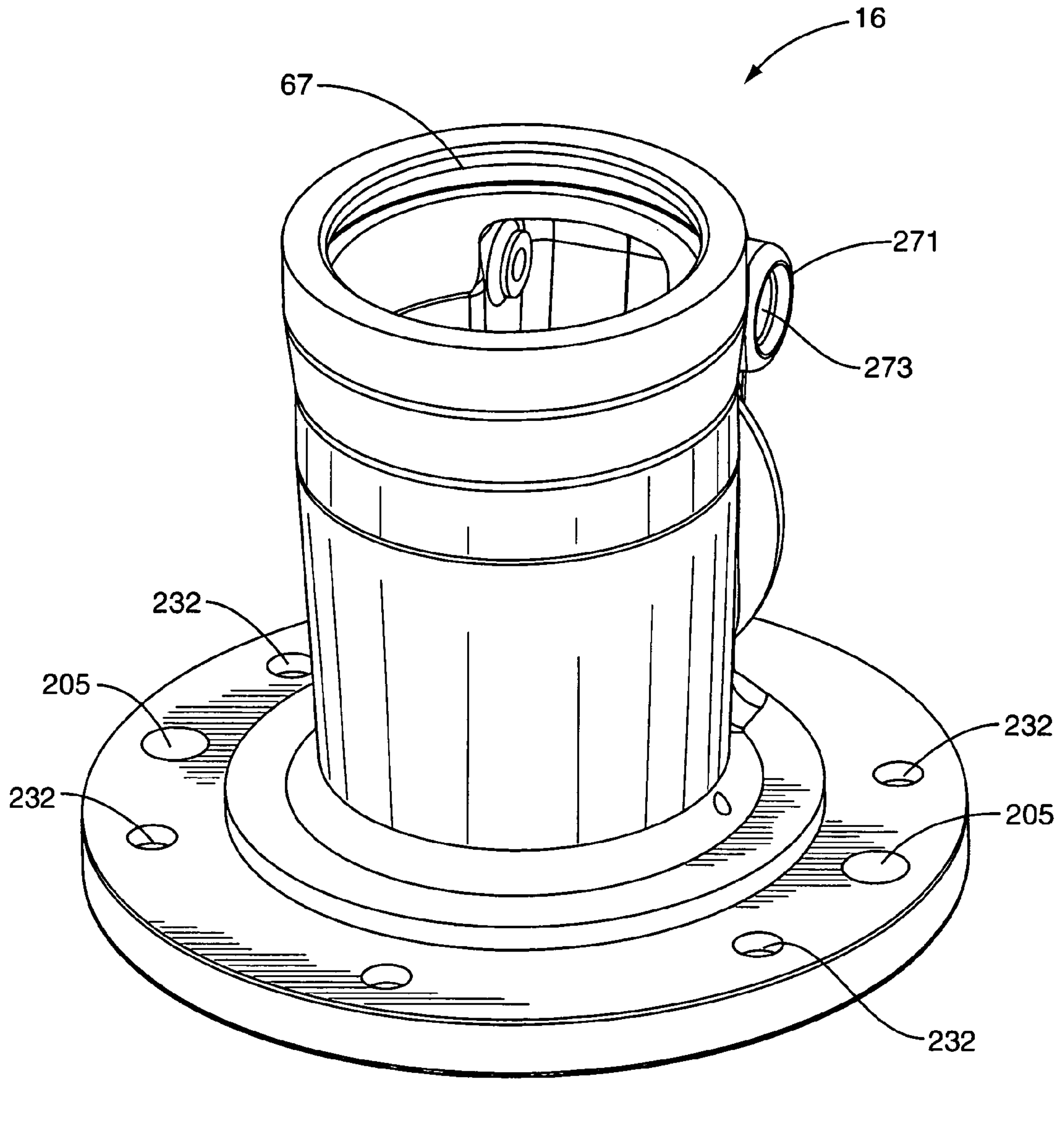
FIG. 17 is an illustration of the upstream housing of the shear valve illustrated in FIG. 10.

FIG. 17 illustrates a perspective view of the upstream housing 16 of the double-walled shear valve 10 illustrated in FIGS. 10 through 15. The containment housing 14 and the downstream housing 12 are not attached to the upstream housing 16 in this figure. A port 271 having a port orifice 273 is shown and provided for the rotatable shaft 88 to fit inside to open and close the two-stage main poppet valve 82, as described above.

Figure 18:
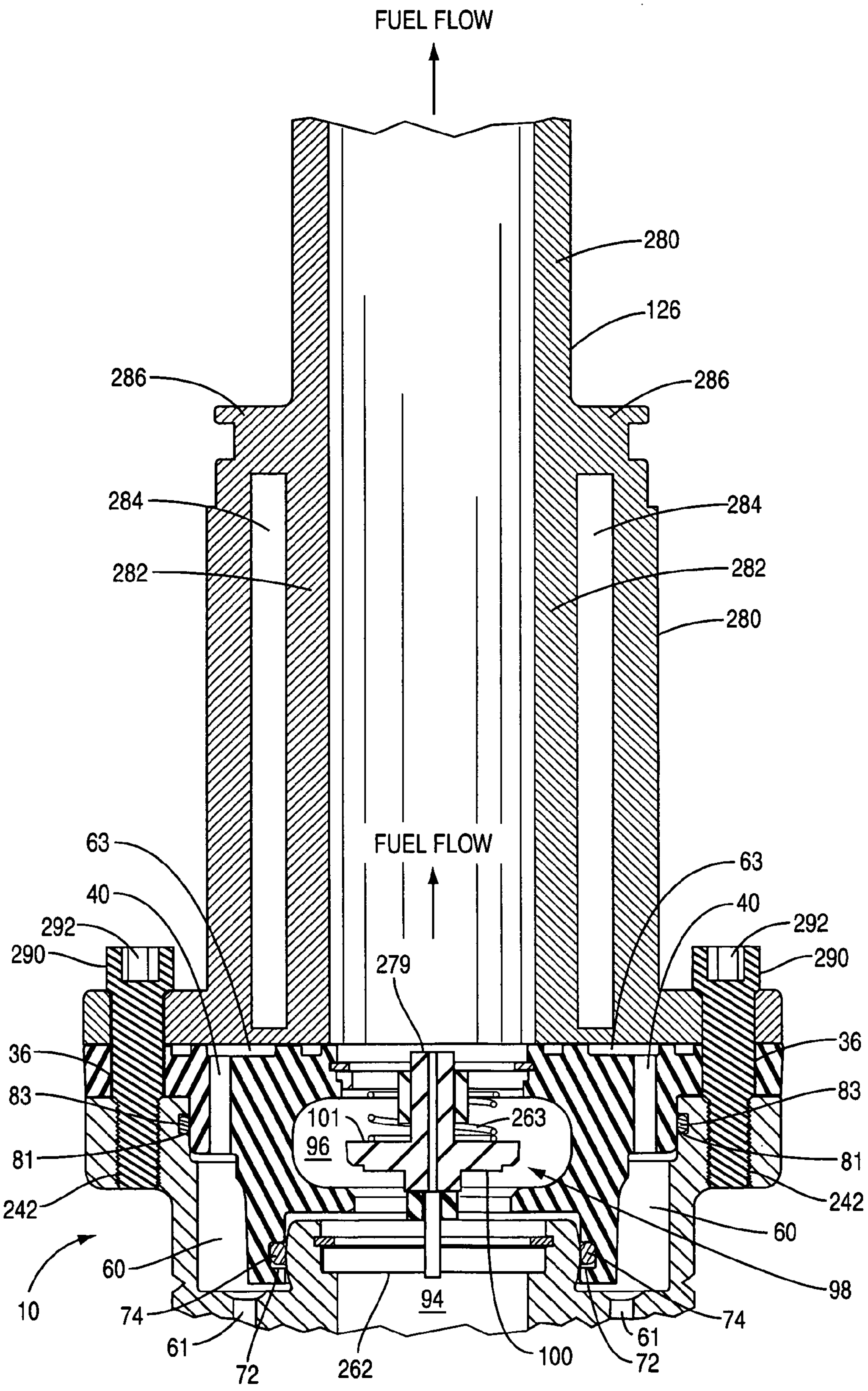
FIG. 18 is an illustration of the coupling of the interstitial space of the shear valve illustrated in FIG. 10 with an interstitial space of internal fuel piping to provide one continuously interstitial space therebetween.

FIG. 18 illustrates the double-walled shear valve 10 as illustrated in FIGS. 10 through 15 coupled to the internal fuel dispenser piping 126. The internal fuel dispenser piping 126 is comprised of an outer piping 280 surrounding by an inner piping 282. An interstitial space 284 is formed between the inner piping 282 and the outer piping 280. The interstitial space 284 extends partially through the internal fuel dispenser piping 126 and is terminated at a termination point 286. The interstitial space 284 of the internal fuel dispenser piping 126 is coupled to the interstitial space 60 of the double-walled shear valve 10 by the attachment of the internal fuel dispenser piping 126 to the downstream housing 12. This is so the interstitial space 284 of the internal fuel dispenser piping 126 and the interstitial space 60 of the shear valve 10 form one contiguous interstitial space 60, 284 to be monitored as one zone or space. As previously described, a vacuum or pressure level generated inside the interstitial space 60, 284 can be monitored for leaks. Further, the vacuum actuator 204 will cause the two-stage main poppet valve 82 to close if a leak occurs in either the shear valve 10 or the internal fuel dispenser piping 126 and as described in the '504 application. The interstitial space orifice 40 is coupled to the circular grooved indention 61 formed in the top of the downstream housing 12, which couples to the interstitial space 284 of the internal fuel dispenser piping 126 when attached to the downstream housing 12.

Figure 19:
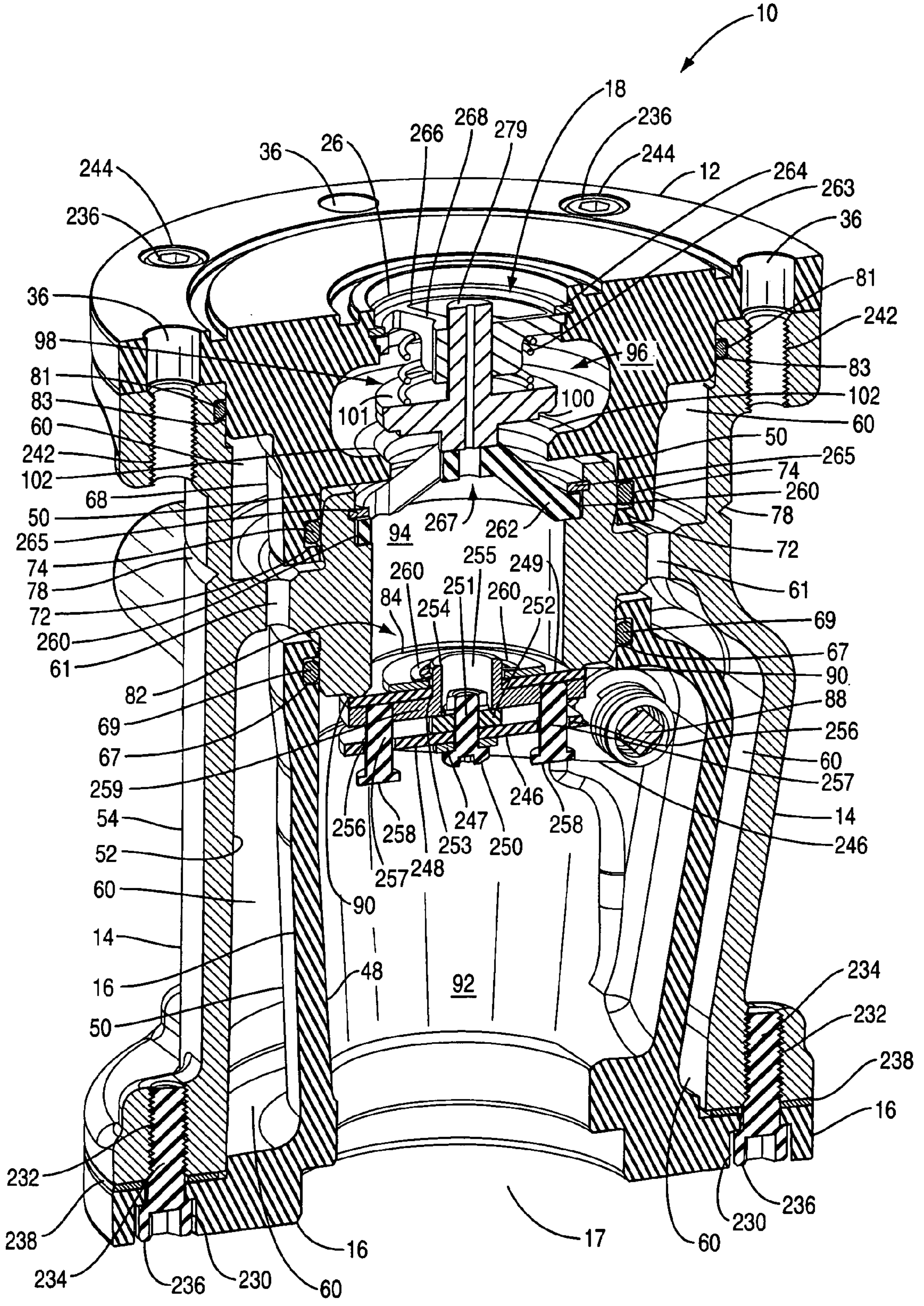
FIG. 19 is an illustration of an alternative embodiment of the shear valve illustrated in FIG. 10 with the interstitial space of the shear valve blocked from extending through the downstream housing.

FIG. 19 illustrates an alternative embodiment of the double-walled shear valve 10 illustrated in FIGS. 10 through 15. All design details of the shear valve 10 illustrated in FIG. 19 are the same as the shear valve 10 in FIGS. 10 through 15 with the exception that the interstitial space orifices 40 and circular grooved indention 61 are not provided in the downstream housing 12. In this manner, the interstitial space 60 of the double-walled shear valve 10 is blocked off and cannot not extend through the downstream housing 12 of the double-walled shear valve 10 when attached to the internal fuel dispenser piping 126, even if the internal fuel dispenser piping 126 contains an interstitial space 284 like that illustrated in FIG. 18. In this manner, only the interstitial space 60 of the shear valve 10 controls the vacuum actuator 204. A monitoring system designed to generate and/or monitor a vacuum or pressure level in the interstitial space 60 for leaks cannot be used for the fuel dispenser piping interstitial space 284 unless the shear valve 10 illustrated in FIG. 19 is used in an unintended and/or unauthorized manner.

Figure 20:
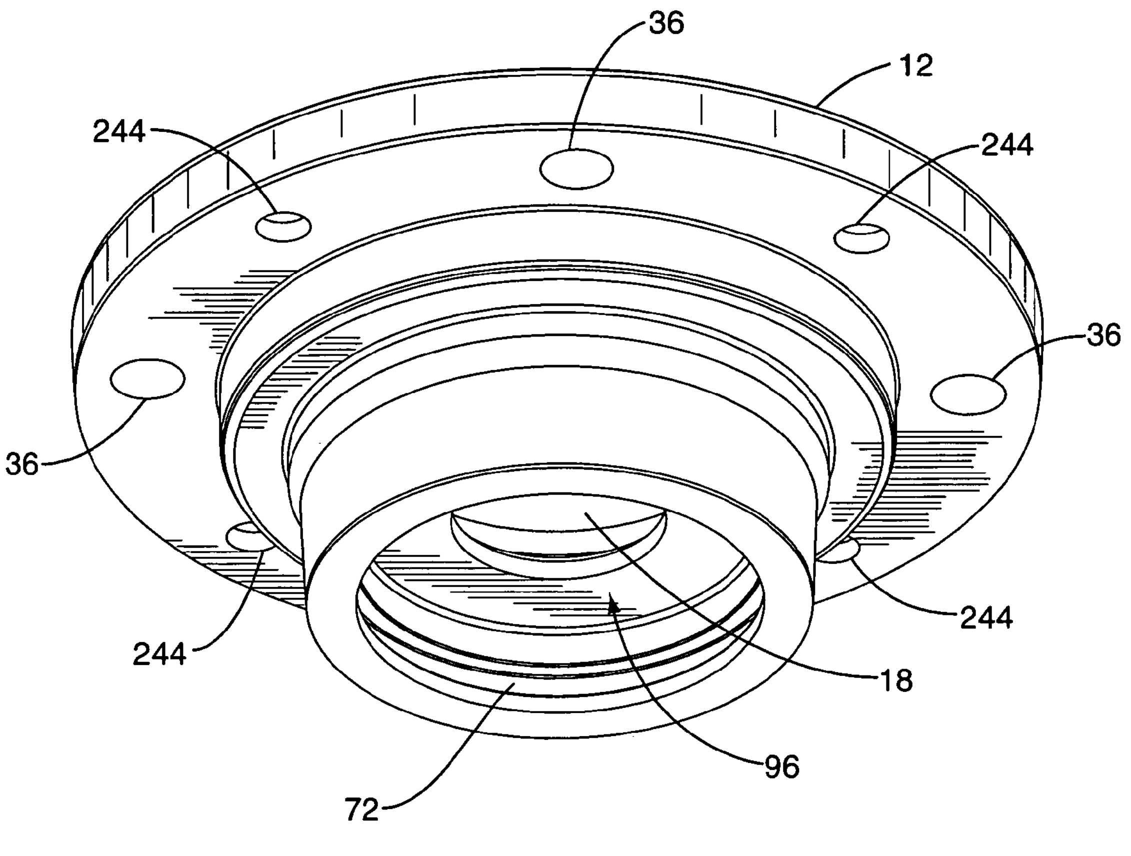
FIG. 20 is an illustration of the downstream housing used in the shear valve illustrated in FIG. 19.

FIG. 20 illustrates a perspective view of the modified downstream housing 12 used with the double-walled shear valve 10 illustrated in FIG. 18. Note that the interstitial space orifices 40 are not provided like that included in the downstream housing 12 illustrated in FIG. 15.

Those skilled in the art will recognize improvements and modifications to the preferred embodiments of the present invention. All such improvements and modifications are considered within the scope of the concepts disclosed herein and the claims that follow.

What we claim is:

1. A shear valve that carries fuel from a branch or main fuel piping to fuel dispenser piping, comprising:

a housing defining a shear groove on the outside circumference of the housing, the housing comprised of an inner housing orifice forming a fuel flow path therein; and a two-stage poppet valve located in the fuel flow path that controls the flow of fuel through the fuel flow path;

wherein the two-stage poppet valve is adapted to change position in response to a change in pressure in an interstitial space of a fuel-handling component.

2. The shear valve of claim 1, wherein less force is required to open the two-stage poppet valve in a second opening stage than to open the two-stage poppet valve in a first opening stage.

3. The shear valve of claim 1, wherein the two-stage poppet valve contains an inner diameter tube adapted to be opened in a first opening stage to start to equalize pressure across the two-stage poppet valve.

4. The shear valve of claim 1, wherein the two-stage poppet valve comprises a two-stage poppet valve head that is adapted to rest against a two-stage poppet valve seat within the fuel flow path to close off the fuel flow path to prevent flow of fuel.

5. The shear valve of claim 3, wherein the two-stage poppet valve comprises a two-stage poppet valve head that is adapted to rest against a two-stage poppet valve seat within the fuel flow path to close off the fuel flow path to prevent flow of fuel.

6. The shear valve of claim 5, wherein the inner diameter tube extends through the two-stage poppet valve head and having an inner diameter orifice of less diameter than the diameter of the two-stage poppet valve head, wherein the fuel flow path fluidly extends through the inner diameter orifice when opened in the first opening stage.

7. The shear valve of claim 6, wherein the two-stage poppet valve head is opened from the two-stage poppet valve seat in the second opening stage.

8. The shear valve of claim 1, wherein the two-stage poppet valve is adapted to be opened with less force in a second opening stage than to open the two-stage poppet valve in a first opening stage.

9. The shear valve of claim 1, further comprising a rotatable shaft extending through the housing and attached the two-stage poppet valve, wherein a force applied to the rotatable shaft keeps the two-stage poppet valve open.

10. The shear valve of claim 9, further comprising a spring that biases the rotatable shaft to keep the two-stage poppet valve closed.

11. The shear valve of claim 10, wherein the two-stage poppet valve is opened by applying a force to the rotatable shaft to overcome the force of the spring.

12. The shear valve of claim 11, wherein a release of energy in the spring causes the rotatable shaft to close the two-stage poppet valve.

13. The shear valve of claim 6, further comprising a rotatable shaft extending through the housing and attached the two-stage poppet valve, wherein a force applied to the rotatable shaft keeps the two-stage poppet valve open.

14. The shear valve of claim 13, wherein the force applied to the rotatable shaft opens the inner diameter seal from the inner diameter orifice before the two-stage poppet valve head opens from the two-stage poppet valve seat so that pressure across the inner diameter orifice begins to equalize thereby requiring less force to open the two-stage poppet valve head from the two-stage poppet valve seat.

15. The shear valve of claim 14, further comprising a flapper coupled between the two-stage poppet valve and the rotatable shaft.

16. The shear valve of claim 15, wherein applying an initial force to the flapper opens the inner diameter seal from the inner diameter orifice.

17. The shear valve of claim 15, wherein the flapper contains at least one flapper orifice adapted to move about a protruding shaft attached perpendicularly to the two-stage poppet valve, wherein the flapper is adapted to apply a force to the protruding shaft to apply the force to the two-stage poppet valve when a force is applied to the rotatable shaft and after the inner diameter seal is opened to open the two-stage poppet valve.

18. The shear valve of claim 1, wherein a two-stage poppet valve head is secured to an inner diameter tube via a retaining ring that surrounds the inner diameter tube.

19. A method of controlling the flow of fuel from a branch or main fuel piping to fuel dispenser piping, comprising the steps of:

detecting a pressure level using an actuator coupled to a two-stage poppet valve, wherein the two-stage poppet valve is located in a fuel flow path formed from an inner diameter orifice inside a housing;

opening the two-stage poppet valve using the actuator by applying a first force in a first opening stage; and opening the two-stage poppet valve using the actuator by applying a second force less than the first force in a second opening stage to fully open the two-stage poppet valve.

20. The method of claim 19, wherein opening the two-stage poppet valve in the first opening stage comprises opening an inner diameter tube to start to equalize pressure across the two-stage poppet valve in the first opening stage.

21. The method of claim 19, wherein opening the two-stage poppet valve in the second opening stage comprises opening a two-stage poppet valve head that is adapted to rest against a two-stage poppet valve seat within the fuel flow path in the second opening stage.

22. The method of claim 20, wherein the inner diameter tube extends through a two-stage poppet valve head and having an inner diameter orifice of less diameter than the diameter of the two-stage poppet valve head, wherein the fuel flow path fluidly extends through the inner diameter orifice when opened in the first opening stage.

23. The method of claim 19, further comprising applying the first and second forces comprising applying forces to a rotatable shaft extending through the housing and attached the two-stage poppet valve, to open the two-stage poppet valve.

24. The method of claim 23, wherein the applying a force to the rotatable shaft further comprises:

applying the first force to the rotatable shaft extending through the housing and attached to the two-stage poppet valve, to open the two-stage poppet valve in the first opening stage, and applying the second force less than the first force to the rotatable shaft to open the two-stage poppet valve in the second opening stage.

25. The method of claim 24, wherein applying the first force further comprises opening an inner diameter seal from the inner diameter orifice.

26. The method of claim 24, wherein applying the second force further comprises opening a two-stage poppet valve head from a two-stage poppet valve seat.

27. The method of claim 24, wherein applying the first force further comprises applying the first force to a flapper coupled between the two-stage poppet valve and the rotatable shaft to open the inner diameter seal from the inner diameter orifice in the first opening stage.

28. The method of claim 26, wherein applying the first and second force further comprises:

moving a protruding shaft attached perpendicularly to the two-stage poppet valve along at least one flapper orifice in the flapper in the first opening stage, and applying a force to the protruding shaft to apply the force to the two-stage poppet valve when a force is applied to the rotatable shaft in the second opening stage.

* * * * *